United States Patent
Ikeya et al.

(10) Patent No.: US 12,516,288 B2
(45) Date of Patent: Jan. 6, 2026

(54) METHOD FOR PRODUCING ENTERIC NEURAL PRECURSORS

(71) Applicants: Kyoto University, Kyoto (JP); Takeda Pharmaceutical Company Limited, Osaka (JP)

(72) Inventors: Makoto Ikeya, Kyoto (JP); Yayoi Kamiya, Kyoto (JP); Daisuke Kamiya, Kyoto (JP); Teruyoshi Yamashita, Kanagawa (JP); Kazumi Take, Kanagawa (JP)

(73) Assignees: Kyoto University, Kyoto (JP); Takeda Pharmaceutical Company Limited, Osaka (JP)

( * ) Notice: Subject to any disclaimer, the term of this patent is extended or adjusted under 35 U.S.C. 154(b) by 447 days.

(21) Appl. No.: 17/270,162

(22) PCT Filed: Aug. 21, 2019

(86) PCT No.: PCT/JP2019/032543
§ 371 (c)(1),
(2) Date: Feb. 22, 2021

(87) PCT Pub. No.: WO2020/040166
PCT Pub. Date: Feb. 27, 2020

(65) Prior Publication Data
US 2021/0198624 A1    Jul. 1, 2021

(30) Foreign Application Priority Data
Aug. 22, 2018 (JP) .................. 2018-155395

(51) Int. Cl.
*C12N 5/079*    (2010.01)
(52) U.S. Cl.
CPC ........ *C12N 5/0622* (2013.01); *C12N 2500/30* (2013.01); *C12N 2501/13* (2013.01); *C12N 2501/999* (2013.01)
(58) Field of Classification Search
CPC .............. C12N 5/0622; C12N 2500/30; C12N 2501/13; C12N 2501/999
See application file for complete search history.

(56) References Cited

U.S. PATENT DOCUMENTS

| | | |
|---|---|---|
| 2002/0132987 A1 | 9/2002 | Anderson |
| 2017/0292116 A1 | 10/2017 | Wells et al. |
| 2018/0093016 A1 | 4/2018 | Bitar |
| 2018/0140637 A1 | 5/2018 | Sieber-Blum |
| 2018/0155682 A1 | 6/2018 | Kida et al. |
| 2020/0017829 A1 | 1/2020 | Nishiyama et al. |
| 2020/0102543 A1 | 4/2020 | Okazaki et al. |
| 2021/0002608 A1 | 1/2021 | Ikeya et al. |

FOREIGN PATENT DOCUMENTS

| | | |
|---|---|---|
| CN | 106367390 A | 2/2017 |
| CO | NC2020000772 | 6/2020 |
| EP | 3207123 A1 | 8/2017 |
| EP | 3719120 A1 | 10/2020 |
| JP | 2017532964 A | 11/2017 |
| JP | 2019-14 A | 1/2019 |
| TW | 201816114 A | 5/2018 |
| WO | 2016/061464 A1 | 4/2016 |
| WO | 2016104574 A1 | 6/2016 |
| WO | 2016/194522 A1 | 12/2016 |
| WO | 2017112901 A1 | 6/2017 |
| WO | 2018199142 A1 | 11/2018 |
| WO | 2018230102 A1 | 12/2018 |
| WO | 2019107485 A1 | 6/2019 |

OTHER PUBLICATIONS

Uchida, H. et al., "A xenogeneic-free system generating functional human gut organoids from pluripotent stem cells," Journal of Clinical Investigation 2(1): e86492. doi: 10.1172/jci.insight.86492. (Year: 2017).*
Young, H. M., et al., "Acquisition of neuronal and glial markers by neural crest-derived cells in the mouse intestine," The Journal of Comparative Neurology 456(1): 1-11. doi: 10.1002/cne.10448. Published online Dec. 2002. (Year: 2002).*
Aquino, J. B., et al., Experimental Neurology 198(2): 438-449. doi: 10.1016/j.expneurol.2005.12.015. (Year: 2006).*
Okamura, Y., and Saga, Y., "Notch signaling is required for the maintenance of enteric neural crest progenitors," Development 135(21): 3555-3565. doi: 10.1242/dev.022319. (Year: 2008).*
Kruger, G. M., et al., "Neural crest stem cells persist in the adult gut but undergo changes in self-renewal, neuronal subtype potential, and factor responsiveness," Neuron 35(4): 657-669. doi: 10.1016/s0896-6273(02)00827-9. (Year: 2002).*
McCraken, K. W., et al., "Modelling human development and disease in pluripotent stem-cell-derived gastric organoids," Nature 516, 400-404. doi: 10.1038/nature13863. (Year: 2014).*
Li et al., Characterization and transplantation of enteric neural crest cells from human induced pluripotent stem cells. Mol Psychiatry. Mar. 2018;23(3):499-508.
Japanese Office Action for Application No. 2020-538418, dated Apr. 25, 2023, 16 pages.
European Office Action for Application No. 19852577.6, dated Apr. 4, 2022, 17 pages.
Jairui et al., Role of neuregulin 1 in regulating the development of enteric nervous system in zebrafish. Chinese Journal of Pediatric Surgery. Sep. 30, 2015;36(9):649-55.

(Continued)

*Primary Examiner* — Tracy Vivlemore
*Assistant Examiner* — Eric J Rogers
(74) *Attorney, Agent, or Firm* — McCarter & English, LLP; David G. Conlin

(57) ABSTRACT

A method for producing enteric neural precursors, comprising the steps of: (1) providing enteric neural precursors; and (2) culturing the enteric neural precursors in a medium comprising an ERBB3 agonist and/or an ERBB4 agonist is provided as a technique for allowing enteric neural precursors to proliferate by culture while maintaining their differentiation capacity into enteric nerve cells and glial cells.

10 Claims, 10 Drawing Sheets
Specification includes a Sequence Listing.

(56) References Cited

OTHER PUBLICATIONS

Múnera et al., Generation of Gastrointestinal Organoids from Human Pluripotent Stem Cells. Methods Mol Biol. 2017;1597:167-177.
Chinese Office Action for Application No. 201980055151.8, dated Aug. 10, 2022, 13 pages.
European Office Action for Application No. 19852577.6, dated Jun. 27, 2022, 16 pages.
Cheng, L.S. et al. (Mar. 1, 2017) "Postnatal human enteric neuronal progenitors can migrate, differentiate, and proliferate in embryonic and postnatal aganglionic gut environments", Pediatric Research 81(5):838-846.
Fattahi, F. et al. (Feb. 10, 2016) "Deriving human ENS lineages for cell therapy and drug discovery in Hirschsprung disease", Nature 531(7592):105-109.
Kim, H.S. et al. (May 11, 2017) "Schwann Cell Precursors from Human Pluripotent Stem Cells as a Potential Therapeutic Target for Myelin Repair", Stem Cell Reports 8(6):1714-1726.
Uchida, H. et al. (Jan. 12, 2017) "A xenogeneic-free system generating functional human gut organoids from pluripotent stem cells" JCI Insight 2(1):e86492, 1-13.
Uesaka, T. et al. (Oct. 9, 2013) "GDNF Signaling Levels Control Migration and Neuronal Differentiation of Enteric Ganglion Precursors", The Journal of Neuroscience 33(41):16372-16382.
Ikeya, M. (2017) "Induction of mesenchymal stem cells from pluripotent stem cells mediated through neural crest cells and possibility of application to regenerative medicine", Nihon Shishubyo Gakkai Kaishi 59:150 (English translation).
International Search Report corresponding to Patent Application No. PCT/JP2019/032543, issued Nov. 19, 2019.
Heanue et al., Prospective identification and isolation of enteric nervous system progenitors using Sox2. Stem Cells. Jan. 2011;29(1):128-40.
Fukuta et al., Derivation of mesenchymal stromal cells from pluripotent stem cells through a neural crest lineage using small molecule compounds with defined media. PLoS One. Dec. 2, 2014;9(12):e112291, 25 pages.
Lee et al., Derivation of neural crest cells from human pluripotent stem cells. Nat Protoc. Apr. 2010;5(4):688-701.
Columbian Office Action for Application No. NC2021/0002704, dated Oct. 31, 2023, 19 pages.
Taiwan Office Action for Application No. 108129822, dated Jan. 31, 2024, 17 pages.
Israel Office Action for Application No. 280621, dated Dec. 26, 2024, 8 pages.

* cited by examiner

METHOD FOR PRODUCING ENTERIC NEURAL PRECURSORS

RELATED APPLICATIONS

This application is a national stage application filed under 35 U.S.C. § 371, of International Patent Application No. PCT/JP2019/032543, filed Aug. 21, 2019, which claims the benefit of and priority to JP2018-155395, filed Aug. 22, 2018, the entire contents of which are hereby expressly incorporated by reference herein.

INCORPORATION BY REFERENCE OF SEQUENCE LISTING

The contents of the text file named "PT38-9033US_Sequence_Listing.txt", which was created on Feb. 2, 2021 and is 5,843 bytes in size, are hereby incorporated by reference in their entireties and for all purposes.

TECHNICAL FIELD

The present invention relates to a method for producing enteric neural precursors and an expansion culture method, and a medium for use in these methods.

BACKGROUND OF INVENTION

Neural crest cells (NCCs) are cells that develop from between the neuroectoderm and the epidermal ectoderm when the neural tube is formed from the neural plate during early development. Enteric neural precursors (ENPs) are cells that have developed from these NCCs and differentiated into an enteric nerve cell lineage. ENPs have differentiation capacity into enteric nerve cells and glial cells.

Hirschsprung disease, which suppresses gastrointestinal motility, is a disease caused by congenital intestinal aganglionosis. In recent years, a fundamental approach aimed at treating Hirschsprung disease by autotransplanting ENPs that have collected from patients and allowed to proliferate ex vivo has been reported (Non Patent Literature 1).

Studies to induce NCCs from pluripotent stem cells such as inducible pluripotent stem cells (iPSCs) and further induce ENPs from the NCCs have been made for the production of cell medicaments containing ENPs.

For example, Non Patent Literature 2 states that enteric nervous system progenitors were prepared from human pluripotent stem cells. Non Patent Literature 2 neither discloses PHOX2B-positive enteric neural precursors nor describes neuregulin-1 (NRG1).

Non Patent Literature 3 states that Schwann cell precursors were prepared by culturing human iPSCs in a medium containing a TGFβ inhibitor, a GSK3β inhibitor and NRG1. The method described in Non Patent Literature 3 does not employ retinoic acid, and the resulting Schwann cell precursors are cells different from ENPs (for example, ENPs are positive to PHOX2B expression, whereas the Schwann cell precursors described in the literature are negative thereto).

CITATION LIST

Non Patent Literature

[Non Patent Literature 1] "Postnatal human enteric neuronal progenitors can migrate, differentiate, and proliferate in embryonic and postnatal aganglionic gut environments", Pediatric Research, 2017, 81, 5, 838-846

[Non Patent Literature 2] "Deriving human ENS lineages for cell therapy and drug discovery in Hirschsprung disease", Nature, 2016, 531, 105-109

[Non Patent Literature 3] "Schwann Cell Precursors from Human Pluripotent Stem Cells as a Potential Therapeutic Target for Myelin Repair", Stem Cell Reports, 2017, 8, 1714-1726

SUMMARY OF INVENTION

Technical Problem

A technique capable of supplying ENPs in large amounts is demanded for the achievement of cellular therapy, etc. using ENPs. Although a method for inducing enteric nervous system progenitors from human pluripotent stem cells has been reported as mentioned above (Non Patent Literature 2), an approach for the proliferation and expansion culture of induced ENPs has not yet been developed.

A main object of the present invention is to provide a technique for allowing ENPs to proliferate while maintaining their differentiation capacity into enteric nerve cells and glial cells (multipotency).

Solution to Problem

In order to attain the object, the present invention provides the following [1] to [27].

[1] A method for producing enteric neural precursors, comprising the steps of:
  (A1) providing enteric neural precursors;
  (A2) culturing the enteric neural precursors in a medium comprising an ERBB3 agonist and/or an ERBB4 agonist.

[2] The production method according to [1], wherein the medium further comprises a TGFβ inhibitor and a GSK3β inhibitor.

[3] The production method according to [1] or [2], wherein the medium further comprises retinoic acid and/or a derivative thereof.

[4] The production method according to any of [1] to [3], wherein the medium further comprises GDNF.

[5] The production method according to any of [1] to [4], wherein the medium further comprises Matrigel®.

[6] The production method according to any of [1] to [5], wherein the ERBB3 agonist and/or the ERBB4 agonist is NRG1.

[7] Enteric neural precursors obtained by a production method according to any of [1] to [6].

[8] A frozen stock comprising enteric neural precursors according to [7].

[9] A cell medicament comprising enteric neural precursors according to [7].

[10] A method for producing enteric neural precursors, comprising the steps of:
  (B1) providing neural crest cells;
  (B2) culturing the neural crest cells in a medium comprising an ERBB3 agonist and/or an ERBB4 agonist, and retinoic acid and/or a derivative thereof.

[11] The production method according to [10], wherein the neural crest cells are vagal neural crest cells.

[12] The production method according to [11], wherein
  the vagal neural crest cells are SOX10-positive, HOXB5-positive, HOXB9-negative and PHOX2B-negative, and
  the enteric neural precursors are SOX10-positive and PHOX2B-positive.

[12a] The production method according to any of [10] to [12], wherein the medium further comprises a TGFβ inhibitor and/or a GSK3β inhibitor.
[12b] The production method according to any of [10] to [12a], wherein the medium further comprises retinoic acid and/or a derivative thereof.
[12c] The production method according to any of [10] to [12b], wherein the medium further comprises GDNF.
[12d] The production method according to any of [10] to [12c], wherein the medium further comprises Matrigel®.
[12e] The production method according to any of [10] to [12d], wherein the ERBB3 agonist and/or the ERBB4 agonist is NRG1.
[12f] Enteric neural precursors obtained by a production method according to any of [10] to [12e].
[13] An enteric neural precursor medium comprising an ERBB3 agonist and/or an ERBB4 agonist.
[14] The medium according to [13], further comprising a TGFβ inhibitor and/or a GSK3β inhibitor.
[15] The medium according to [13] or [14], further comprising retinoic acid and/or a derivative thereof.
[16] The medium according to any of [13] to [15], further comprising GDNF.
[17] The medium according to any of [13] to [16], further comprising Matrigel®.
[18] The medium according to any of [13] to [17], wherein the ERBB3 agonist and/or the ERBB4 agonist is NRG1.
[19] An expansion culture method for enteric neural precursors, comprising the steps of:
  (C1) providing enteric neural precursors; and
  (C2) culturing the enteric neural precursors in a medium comprising an ERBB3 agonist and/or an ERBB4 agonist.
[20] A method for producing an intestinal organoid, comprising the step of coculturing enteric neural precursors and hindgut cells.
[21] A method for producing an artificial intestinal tract, comprising the steps of: coculturing enteric neural precursors and hindgut cells to obtain an intestinal organoid; and transplanting the intestinal organoid into a living body to form an artificial intestinal tract.
[21a] A method for producing an artificial intestinal tract, comprising the steps of: coculturing enteric neural precursors and hindgut cells to obtain an intestinal organoid; and transplanting the intestinal organoid into a non-human mammalian living body to form an artificial intestinal tract.
[22] The production method according to any of [20] to [21a], wherein the enteric neural precursors are enteric neural precursors obtained by a production method according to any of [1] to [6].
[23] An intestinal organoid obtained by a production method according to [20] or [22].
[24] An artificial intestinal tract obtained by a production method according to any of [21] to [22].
[25] An additive for an enteric neural precursor medium, comprising an ERBB3 agonist and/or an ERBB4 agonist.
[26] Use of an ERBB3 agonist and/or an ERBB4 agonist for the expansion culture of enteric neural precursors.
[27] The additive according to [25] or the use according to [26], wherein the ERBB3 agonist and/or the ERBB4 agonist is NRG1.

In the present invention, "neural crest cells (NCCs)" are cells that develop from between the neuroectoderm and the epidermal ectoderm when the neural tube is formed from the neural plate during early development. These cells have multipotency to differentiate into many types of cells such as nerve cells, glial cells, mesenchymal stromal cells, bone cells, chondrocytes, corneal cells and pigment cells, and the ability to self-proliferate. NCCs are SOX10-positive.

"Cranial neural crest cells (cranial NCCs)" are a cell population that emerges nearer to the cranial side than the ear vesicle during development and differentiates into facial bone, cartilage and nerve, etc. The cranial neural crest cells are cells positive to a neural crest cell marker SOX10 and negative to a group of HOXB genes (HOXB1-10).

"Vagal neural crest cells (vagal NCCs)" are a cell population that emerges from a site corresponding to the 1st to 7th segments during development and differentiates into the enteric nervous system, etc. The vagal neural crest cells are positive to a neural crest cell marker SOX10 and are HOXB5-positive, HOXB9-negative and PHOX2B-negative. Preferably, these cells are SOX10-positive and are HOXB1-7-positive, HOXB9-negative, HOXB10-negative and PHOX2B-negative.

"Trunk neural crest cells (trunk NCCs)" are a cell population that emerges from a site corresponding to the 8th segment to the caudal end during development and differentiates into the automatic nervous system, sensory nerve, pigment cells and adrenal cortical chromaffin cells, etc. The trunk neural crest cells are positive to a neural crest cell marker SOX10 and are HOXB1-9-positive, HOXB10-negative and PHOX2B-negative.

"Sacral neural crest cells (sacral NCCs)" are a cell population that emerges from a site corresponding to the extreme caudal end during development and differentiates into a partial enteric nervous system of the large intestine, etc. The sacral neural crest cells are positive to a neural crest cell marker SOX10 and are HOXB1 to 10-positive and PHOX2B-negative.

"Enteric neural precursors (ENPs)" are cells that emerge by the differentiation of vagal neural crest cells and sacral neural crest cells and are positive to neural crest cell and glial cell markers SOX10 and PHOX2B. ENPs have differentiation capacity into PHOX2B-positive and SOX10-negative enteric nerve cells, and S100β-positive, PLP1-positive and SOX10-positive glial cells.

"Enteric nerve cells" are derived from enteric neural precursors and are PHOX2B-positive and SOX10-negative.

"Glial cells" are S100β-positive, PLP1-positive and SOX10-positive, or are GFAP-positive. As used herein, the glial cells are also referred to as, particularly, "enteric glial cells". The enteric glial cells can be obtained, for example, by allowing enteric neural precursors to differentiate into glial cells.

"Enteric neural precursor medium" is a medium that is used for the production of ENPs and/or the expansion culture of ENPs. The production of ENPs may include the differentiation of stem cells such as iPS cells, ES cells and NCCs into ENPs.

"Intestinal organoid" is a tissue structure prepared in vitro and means a tissue structure having one or more of a plurality of functions possessed by the intestines of mammals such as humans (for example, a peristalsis function, a mucus secretion function, and a substance absorption function) or functions similar thereto. The intestinal organoid is constituted by a cell population comprising, for example, cells of the origin of various cells constituting the intestinal tract, such as hindgut cells and foregut cells, and at least one type of cell selected from various cells constituting the intestinal tract, such as hindgut cells, foregut cells, enteric nerve cells, enteric neural precursors, intestinal stem cells (LGR5-positive), Paneth cells (LYZ-positive), goblet cells (Mucin-positive) and secretory cells, and cells of the origin of these cells.

"Artificial intestinal tract" is a tissue structure obtained by transplanting an intestinal organoid into a human or non-human mammalian living body and maturating the intestinal organoid, and means a tissue structure having one or more of a plurality of functions possessed by the intestines of mammals such as humans (for example, a peristalsis function, a mucus secretion function, and a substance absorption function) or functions similar thereto. The artificial intestinal tract is prepared, for example, by transplanting an intestinal organoid into the body (for example, the peritoneal cavity) of a mammal such as a mouse, followed by a lapse of a given period. The artificial intestinal tract comprises a cell population comprising, for example, cells of the origin of various cells constituting the intestinal tract, such as hindgut cells and foregut cells, and at least one type of cell selected from various cells constituting the intestinal tract, such as hindgut cells, foregut cells, enteric nerve cells, enteric neural precursors, intestinal stem cells (LGR5-positive), Paneth cells (LYZ-positive), goblet cells (Mucin-positive) and secretory cells, and cells of the origin of these cells. The artificial intestinal tract may further comprise, for example, muscle cells and pacemaker cells. In this case, nerve cells are arranged between muscle cells.

"Hindgut cells" are cells that emerge by the differentiation of the endoderm in the course of development and is characterized by being CDX2-positive. A hindgut cell mass may comprise hindgut cells as well as epithelial cells (E-cadherin-positive) and mesenchymal cells (vimentin-positive).

"Definitive endoderm" is a cell that emerges by the differentiation of the anterior primitive streak in the course of development and is characterized by being SOX17-positive and FOXA2-positive.

"ERBB3" is a tyrosine kinase receptor encoded by ERBB3 gene and is a member of the EGF receptor family. ERBB3 is also called HER3 (human epidermal growth factor receptor 3). ERBB3 forms a heterodimer with ERBB2 and activates signaling pathways involved in the proliferation or differentiation of cells. ERBB3 is known to be expressed in enteric neural precursors. ERBB3 is known to have splicing variants. ERBB3 according to the present invention encompasses these variants without particular limitations.

"ERBB3 agonist" can be any substance having the ability to activate a downstream signaling pathway (ERBB3 agonist activity) by binding to ERBB3 and can include a protein, a peptide, a nucleic acid and a low-molecular compound and their derivatives, etc. The ERBB3 agonist is, for example, a protein such as NRG1, NRG2 and NRG6. The protein such as NRG1, NRG2 and NRG6 may be a full-length protein or may be a fragment thereof having ERBB3 agonist activity.

"ERBB4" is a tyrosine kinase receptor encoded by ERBB4 gene and is a member of the EGF receptor family. ERBB4 is also called HER4 (human epidermal growth factor receptor 4). ERBB4 forms a heterodimer with ERBB2 and activates signaling pathways involved in the proliferation or differentiation of cells. ERBB4 is known to have various splicing variants. ERBB4 according to the present invention encompasses these variants without particular limitations.

"ERBB4 agonist" can be any substance having the ability to activate a downstream signaling pathway (ERBB4 agonist activity) by binding to ERBB4 and can include a protein, a peptide, a nucleic acid and a low-molecular compound and their derivatives, etc. The ERBB4 agonist is, for example, a protein such as NRG1, NRG2, NRG3, NRG4, NRG5, BTC, EPR and HBEGF. The protein such as NRG1-5, BTC, EPR and HBEGF may be a full-length protein or may be a fragment thereof having ERBB4 agonist activity.

"Neuregulin-1 (NRG1)" is an EGF-like growth factor encoded by NRG1 gene. NRG1 is also called heregulin. NRG1 is known to activate a downstream signaling pathway by binding to ERBB3 and ERBB4.

"Glial cell line derived neurotrophic factor (GDNF)" is a factor encoded by GDNF gene and acts as an agonist of GFRα1 and RET. GDNF is known to be associated with the protection of nerve cells and glial cells and the proliferation of enteric neural precursors.

"Matrigel®" is a soluble basement membrane preparation extracted from Engelbreth-Holm-Swarm (EHS) mouse sarcoma rich in extracellular matrix protein. The Matrigel® is composed mainly of laminin, collagen IV, proteoglycan heparan sulfate, and entactin/nidogen 1 and 2. The Matrigel® contains, in addition to these main components, TGFβ, an epithelial cell growth factor (EGF), an insulin-like growth factor (IGF), a fibroblast growth factor (FGF), tissue plasminogen activators 3 and 4, and other growth factors naturally produced in Engelbreth-Holm-Swarm (EHS) tumor.

"Culture" refers to maintenance, proliferation (growth), and/or differentiation of cells in in vitro environment. "Culturing" means maintaining cells and/or allowing the cells to proliferate (grow) and/or differentiate out of tissue or the body, for example, in a cell culture dish or a flask.

"Expansion culture" means culture with the aim of allowing a desired cell population to proliferate and increasing a cell number. The increase in cell number can be achieved through the increased number of cells by proliferation exceeding the decreased number of cells by death, and does not require the proliferation of all cells in the cell population. The increase in cell number may be 1.1 times, 1.2 times, 1.5 times, 2 times, 3 times, 4 times, 5 times, 6 times, 7 times, 8 times, 9 times, 10 times, 15 times, 20 times, or 30 times or more as compared with a cell number before the start of expansion culture.

"Maintenance culture" means the culture of a desired cell population with its cell number maintained. The maintenance of the cell number may be achieved by the survival of cells without proliferation or may be achieved by the balance between the increased number of cells by proliferation and the decreased number of cells by death. The maintenance of the cell number does not require cells to be maintained at completely the same number. Substantially the same number of cells can be maintained in light of the object of the present invention.

"Cell population" means two or more cells of the same type or different types. "Cell population" also means a mass of cells of the same type or different types.

"Adherent culture" means culture in a state where cells are attached to a container, for example, in a state where cells are attached to a cell culture dish or a flask made of a sterilized plastic (or coated plastic) in the presence of an appropriate medium.

"Suspension culture" means culture in a state where cells are dispersed in an appropriate medium without being attached to a container.

"Pluripotency" means the ability to be able to differentiate into tissues and cells having various different shapes and functions and to be able to differentiate into cells of any lineage of the 3 germ layers. "Pluripotency" is different from "totipotency", which is the ability to be able to differentiate into any tissue of the living body, including the placenta, in that pluripotent cells cannot differentiate into the placenta and therefore, do not have the ability to form an individual.

"Multipotency" means the ability to be able to differentiate into plural and limited numbers of linages of cells. For example, mesenchymal stem cells, hematopoietic stem cells, neural stem cells are multipotent, but not pluripotent. ENPs have multipotency to differentiate into nerve cells and glial cells.

"Marker" is "marker protein" or "marker gene" and means a protein that is specifically expressed on cell surface, in cytosol, and/or in nucleus of a predetermined cell type, or a gene thereof. The marker may be a positive selection marker or a negative selection marker. Preferably, the marker is a cell surface marker. Particularly, a cell surface-positive selection marker allows concentration, isolation, and/or detection of living cells.

The marker protein can be detected by use of immunological assay, for example, ELISA, immunostaining, or flow cytometry, using an antibody specific for the marker protein. An antibody that binds to a specific amino acid sequence of the marker protein or a specific sugar chain linked to the marker protein, etc. can be used as the antibody specific for the marker protein. In case of an intracellularly expressed marker protein which does not appear on the surface of cells (for example, a transcription factor or a subunit thereof), the marker protein of interest can be detected by expressing the marker protein with a reporter protein and detecting the reporter protein (for example, Non Patent Literature 4). This method may be preferably used when an appropriate cell surface marker is not found. The marker gene can be detected by use of a method of amplifying and/or detecting nucleic acid known in the art, for example, RT-PCR, microarray, biochip, or RNAseq.

"Expression" is defined as transcription and/or translation of a certain nucleotide sequence driven by an intracellular promoter.

The term "positive" or "expressing" means that a protein or a gene is expressed in an amount detectable by an approach known in the art. The protein can be detected by use of immunological assay, for example, ELISA, immunostaining, or flow cytometry, using an antibody. In case of an intracellularly expressed protein which does not appear on the surface of cells (for example, a transcription factor or a subunit thereof), the protein of interest can be detected by expressing the protein with a reporter protein and detecting the reporter protein. The gene can be detected by use of a method of amplifying and/or detecting nucleic acid, for example, RT-PCR, microarray, biochip, or RNAseq.

The term "negative" or "not expressed" means that the expression level of a protein or a gene is less than the lower limit of detection based on all or any of the known approaches as described above. The detection lower limit of the expression of a protein or a gene may differ depending on each approach.

"SOX10" is found to be expressed in all of neural crest cells, enteric neural precursors and glial cells derived therefrom. On the other hand, SOX10 is not expressed in enteric nerve cells.

"HOXB5" is expressed in vagal neural crest cells, trunk neural crest cells and sacral neural crest cells and known to be necessary for normal development of enteric nerve cells. On the other hand, HOXB5 is not expressed in cranial neural crest cells.

"HOXB9" is expressed in trunk neural crest cells and sacral neural crest cells. On the other hand, HOXB9 is not expressed in cranial neural crest cells and vagal neural crest cells.

"PHOX2B" is found to be expressed in enteric neural precursors and enteric nerve cells derived therefrom.

"GFAP (glial fibrillary acidic protein)" is expressed in glial cells. On the other hand, GFAP is not expressed in enteric neural precursors and enteric nerve cells.

The term "comprise(s)" or "comprising" refers to inclusion of the element(s) following the word without limitations thereto. Thus, this suggests inclusion of the element(s) following the word, but does not suggest exclusion of any other element.

The term "about" or "around" refers to a value which may vary up to plus or minus 30%, 25%, 20%, 15%, 10%, 8%, 6%, 5%, 4%, 3%, 2%, or 1% from the reference value. Preferably, the term "about" or "around" refers to a range from minus or plus 15%, 10%, 5%, or 1% from the reference value.

Advantageous Effects of Invention

The present invention provides a technique for allowing ENPs to proliferate while maintaining their differentiation capacity into enteric nerve cells and glial cells.

BRIEF DESCRIPTION OF DRAWINGS

FIG. 2(A) shows the expression levels of HOXB2, HOXB3, HOXB4, HOXB5, HOXB7 and HOXB9. FIG. 2(B) shows the expression levels of SOX10 and EDNRB. The ordinate shows the expression levels (fold change) by values of a ratio indicated in log 2 with the expression levels in cranial neural crest cells defined as 1.

FIG. 4 is a diagram showing results of flow cytometry analysis on cells obtained by culturing vagal neural crest cells in an enteric neural precursor medium.

FIG. 13(A) shows time-dependent change in cell number during expansion culture (left), and time-dependent change in the ratio of enteric neural precursors to all cells (right). FIG. 13(B) shows results of analyzing the expression of PHOX2B and SOX10 by flow cytometry in enteric neural precursors (ENP, left) and enteric nerve cells (ENS, right) obtained by the differentiation thereof. FIG. 13(C) shows fluorescent immunostaining images of enteric nerve cells and glial cells obtained by the differentiation of enteric neural precursors. In the fluorescent immunostaining images, the green color depicts the fluorescence of PHOX2B-emGFP or the expression of GFAP, and the purple color depicts the expression of peripherin, ChAT, nNOS, GABA, TH or SST.

FIG. 15b is a partially enlarged view of FIG. 15a.

DETAILED DESCRIPTION OF THE INVENTION

Figure 1:
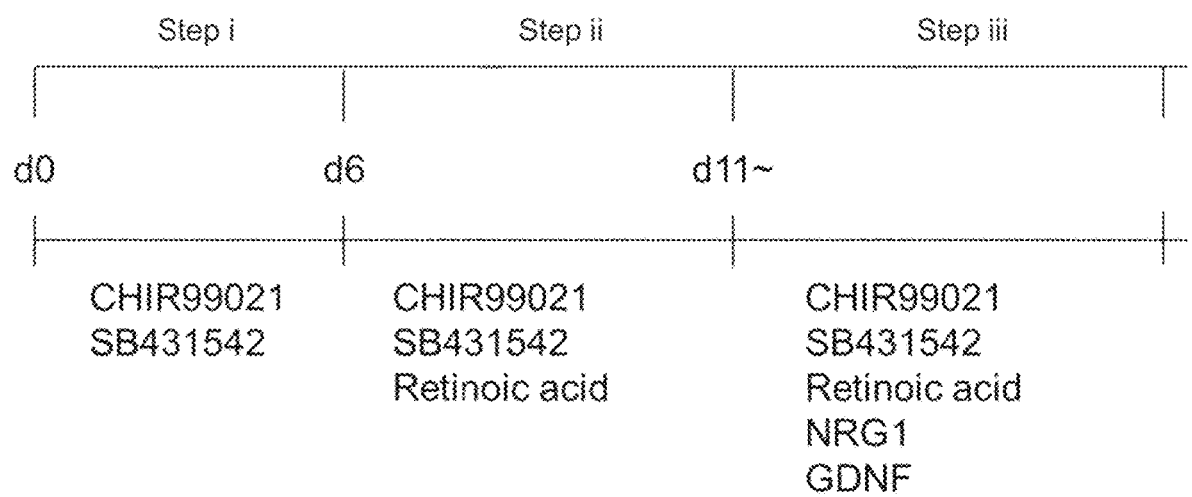
FIG. 1 is a diagram showing a method for producing ENPs according to the second embodiment of the present invention.

Hereinafter, suitable modes for carrying out the present invention will be described. The embodiments described below are given merely for illustrating typical embodiments of the present invention. The scope of the present invention should not be interpreted as being limited by these embodiments.

The present inventors have found that enteric neural precursors (ENPs) may be allowed to proliferate by culturing the ENPs in the presence of an ERBB3 agonist and/or an ERBB4 agonist while their differentiation capacity into enteric nerve cells and glial cells is maintained.

On the basis of this finding, the first embodiment of the present invention provides a method for producing ENPs, comprising the following steps (A1) and (A2):
(A1) providing ENPs; and
(A2) culturing the ENPs in a medium comprising an ERBB3 agonist and/or an ERBB4 agonist.

ENPs proliferate in the step (A2). From this viewpoint, the method for producing ENPs according to the first embodiment is synonymous with an expansion culture method for ENPs.

In the method for producing ENPs according to the present invention, ENPs may be obtained by the differentiation of neural crest cells (NCCs) and proliferation. From this viewpoint, the second embodiment of the present invention provides a method for producing ENPs, comprising the following steps (B1) and (B2):
(B1) providing NCCs; and
(B2) culturing the NCCs in a medium comprising an ERBB3 agonist and/or an ERBB4 agonist, and retinoic acid and/or a derivative thereof.

The third embodiment of the present invention provides an expansion culture method for ENPs, comprising the following steps (C1) and (C2):
(C1) providing ENPs; and
(C2) culturing the ENPs in a medium comprising an ERBB3 agonist and/or an ERBB4 agonist.

Hereinafter, the steps (A1) and (A2) of the method for producing ENPs according to the first embodiment, the steps (B1) and (B2) of the method for producing ENPs according to the second embodiment, and the steps (C1) and (C2) of the expansion culture method for ENPs according to the third embodiment will be described in order.

[Production Method According to First Embodiment (Method Involving ENP Proliferation Step)]

First Embodiment; Step (A1): Step of Providing Enteric Neural Precursors

In this step, ENPs are provided. In this step, at least ENPs can be provided. A single ENP cell, a cell population of ENPs or a cell population comprising ENPs may be provided.

The ENPs to be provided in this step may be commercially obtained ENPs, may be ENPs separated from a living body, or may be ENPs induced from NCCs, etc. by a method mentioned later. The commercially obtained ENPs may be ENPs in a cultured state or may be ENPs in a frozen state. When the ENPs are ENPs induced from NCCs, etc., the ENPs may also be in a cultured state or in a frozen state.

For example, a method of cutting an intestinal tract tissue into 1 mm square, carrying out enzymatic treatment (Dispase and collagenase type XI, 37° C., 90 min), and then culturing the obtained cells in a medium containing EGF and FGF to separate ENPs as aggregated cells is known as a method for separating ENPs from a living body. For the separation, the purity of ENPs may be enhanced by combination with cell sorting using an anti-CD271 antibody.

First Embodiment; Step (A2): Step of Culturing Enteric Neural Precursors

In this step, the ENPs are cultured in a medium comprising an ERBB3 agonist and/or an ERBB4 agonist.

The ERBB3 agonist can be any substance having the ability to activate a downstream signaling pathway (ERBB3 agonist activity) by binding to ERBB3 and can include a protein, a peptide, a nucleic acid and a low-molecular compound and their derivatives, etc. The ERBB3 agonist is, for example, a protein such as NRG1, NRG2 and NRG6. The protein such as NRG1, NRG2 and NRG6 may be a full-length protein or may be a fragment thereof having ERBB3 agonist activity.

The ERBB4 agonist can be any substance having the ability to activate a downstream signaling pathway (ERBB4 agonist activity) by binding to ERBB4 and can include a protein, a peptide, a nucleic acid and a low-molecular compound and their derivatives, etc. The ERBB4 agonist is, for example, a protein such as NRG1, NRG2, NRG3, NRG4, NRG5, BTC, EPR and HBEGF. The protein such as NRG1-5, BTC, EPR and HBEGF may be a full-length protein or may be a fragment thereof having ERBB4 agonist activity.

A human-derived protein or a protein derived from a non-human mammal, for example, a monkey, a pig, cattle, a goat, sheep, a mouse, or a rat is appropriately used as the protein such as NRG1, NRG2, NRG3, NRG4, NRG5, NRG6, BTC, EPR and HBEGF according to the species of the origin of the cells to be cultured.

These proteins can be prepared as recombinant proteins by use of a usual molecular biological approach and may be obtained as commercially available reagents.

The ERBB3 agonist and the ERBB4 agonist are preferably NRG1 or a fragment thereof having ERBB3 agonist activity or ERBB4 agonist activity.

The full-length amino acid sequence of human NRG1 is shown in SEQ ID NO: 1 (NCBI Accession number: NP_039250).

Examples of the fragment of NRG1 having ERBB3 agonist activity or ERBB4 agonist activity include fragments of 10 to 300, 20 to 150, or 30 to 100 amino acids derived from the amino acid sequence of SEQ ID NO: 1.

The fragment of NRG1 can be, for example, a fragment comprising an ERBB3 or ERBB4 binding domain (EGF-like domain). The binding domain is reportedly located at amino acid positions 190 to 220 in SEQ ID NO: 1.

NRG1 and the fragment thereof can be prepared as recombinant proteins by use of a usual molecular biological approach and may be obtained as commercially available reagents. A NRG1 fragment comprising an ERBB3 or ERBB4 binding domain (EGF-like domain) is commercially available (for example, Recombinant Human Heregulinβ-1, Catalog Number: 100-03, PeproTech, Inc.).

NRG1 or the fragment thereof may consist of a modified amino acid sequence derived from the amino acid sequence represented by SEQ ID NO: 1 or a partial sequence thereof by the deletion, substitution, insertion or addition of one or several amino acids and have ERBB3 agonist activity or ERBB4 agonist activity.

In this context, the term "several" means 20 or less, preferably 10 or less, more preferably 5 or less, further preferably 3 or less, most preferably 2.

The modified amino acid sequence may be an amino acid sequence having 80% or higher, preferably 85% or higher, more preferably 90% or higher, further preferably 95% or higher, most preferably 98% or higher identity to the amino acid sequence of SEQ ID NO: 1. The identity of an amino acid sequence can be calculated with a general-purpose analysis tool. For example, BLAST provided by National Center for Biotechnology Information (NCBI) can be utilized.

NRG1 or the fragment thereof may be a fusion protein with another protein or a modified protein bound with another molecule as long as the protein may retain ERBB3 agonist activity or ERBB4 agonist activity.

The ERBB3 agonist activity or ERBB4 agonist activity of a protein fragment or the like can be evaluated using a commercially available kit. For example, PathHunter® ERBB2-ERBB3 Functional Assay or PathHunter® ERBB4 Functional Assay (both from DiscoverX Corp.) is used. A cell line contained in the kit is cultured in the presence of an agonist candidate having varying concentrations, followed by the measurement of β-galactosidase activity. A candidate that exhibits a high value of the P-galactosidase activity has agonist activity.

The concentration of the ERBB3 agonist and/or the ERBB4 agonist in the medium in this step is appropriately adjusted depending on the type of the ERBB3 agonist and/or the ERBB4 agonist to be added. The concentration can be, for example, 1 to 1000 ng/mL, preferably 50 to 200 ng/mL.

In the case of using NRG1 as the ERBB3 agonist and/or the ERBB4 agonist, its concentration in the medium can be, for example, 1 to 1000 ng/mL, preferably 50 to 200 ng/mL, particularly preferably about 100 ng/mL.

The medium may comprise a TGFβ inhibitor and a GSK3β inhibitor.

The "TGFβ inhibitor" is a substance having inhibitory activity against TGFβ (transforming growth factor β). TGFβ is a cytokine binding to two types of serine/threonine protein kinase receptors and controls cell proliferation, cell differentiation, cell death, etc. via signal transduction, mainly, for activating Smad (R-Smad). Examples of the substance having TGFβ inhibitory activity include substances inhibiting the binding of TGFβ to its receptor, and substances inhibiting downstream signals after the binding of TGFβ to its receptor. Examples of the downstream signals include the phosphorylation of TGFβI receptor by TGFβII receptor, and the phosphorylation of Smad by phosphorylated TGFβI receptor. "TGFβ inhibitor" used in the present invention is not particularly limited as long as the TGFβ inhibitor has TGFβ inhibitory activity.

Examples of the TGFβ inhibitor include SB431542 (4-[4-(1,3-benzodioxol-5-yl)-5-(2-pyridinyl)-1H-imidazol-2-yl]-benzamide), A83-01 (4-[4-(1,3-benzodioxol-5-yl)-5-(2-pyridinyl)-1H-imidazol-2-yl]-benzamide), LDN193189 (4-[6-[4-(1-piperazinyl)phenyl]pyrazolo[1,5-a]pyrimidin-3-yl]-quinoline), GW788388 (4-[4-[3-(2-pyridinyl)-1H-pyrazol-4-yl]-2-pyridinyl]-N-(tetrahydro-2H-pyran-4-yl)-benzamide), SM16 (4-[4-(1,3-benzodioxol-5-yl)-5-(6-methyl-2-pyridinyl)-1H-imidazol-2-yl]-bicyclo[2.2.2]octane-1-carboxamide), IN-1130 (3-[[5-(6-methyl-2-pyridinyl)-4-(6-quinoxalinyl)-1H-imidazol-2-yl]methyl]-benzamide), GW6604 (2-phenyl-4-[3-(pyridin-2-yl)-1H-pyrazol-4-yl]pyridine) and SB505124 (2-[4-(1,3-benzodioxol-5-yl)-2-(1,1-dimethylethyl)-1H-imidazol-5-yl]-6-methyl-pyridine). Two or more of these TGFβ inhibitors may be used in combination.

The concentration of the TGFβ inhibitor in the medium in this step is appropriately adjusted depending on the type of the TGFβ inhibitor to be added. The concentration can be, for example, 0.1 to 50 µM, preferably 1 to 20 µM.

In the case of using SB431542 (4-[4-(1,3-benzodioxol-5-yl)-5-(2-pyridinyl)-1H-imidazol-2-yl]-benzamide) as the TGFβ inhibitor, its concentration in the medium can be, for example, 1 to 100 µM, preferably 5 to 20 µM, particularly preferably about 10 µM.

The "GSK3β inhibitor" is a substance having inhibitory activity against GSK3β (glycogen synthase kinase 3β). GSK3 (glycogen synthase kinase 3) is a serine/threonine protein kinase and involved in many signaling pathways associated with the production of glycogen, apoptosis, maintenance of stem cells, etc. GSK3 has the 2 isoforms α and β. "GSK3β inhibitor" used in the present invention is not particularly limited as long as the GSK3β inhibitor has GSK3β inhibitory activity. The GSK3β inhibitor may be a substance having both GSK3β inhibitory activity and GSK30β inhibitory activity.

Examples of the GSK3β inhibitor include CHIR98014 ($N^6$-[2-[[4-(2,4-dichlorophenyl)-5-(1H-imidazol-1-yl)-2-pyrimidinyl]amino]ethyl]-3-nitro-2,6-pyridinediamine), CHIR99021 (6-{2-[4-(2,4-dichlorophenyl)-5-(5-methyl-1H-imidazol-2-yl)pyrimidin-2-ylamino]ethylamino}nicotinonitrile), CP21R7 (3-(3-aminophenyl)-4-(1-methyl-1H-indol-3-yl)-1H-pyrrole-2,5-dione), LY2090314 (3-[9-fluoro-1,2,3,4-tetrahydro-2-(1-piperidinylcarbonyl)pyrrolo[3,2,1-jk][1,4]benzodiazepin-7-yl]-4-imidazo[1,2-a]pyridin-3-yl-1h-pyrrole-2,5-dione), TDZD-8 (4-benzyl-2-methyl-1,2,4-thiadiazolidine-3,5-dione), SB216763 (3-(2,4-dichlorophenyl)-4-(1-methyl-1H-indol-3-yl)-1H-pyrrole-2,5-dione), TWS-119 (3-[[6-(3-aminophenyl)-7H-pyrrolo[2,3-d]pyrimidin-4-yl]oxyphenol ditrifluoroacetate), kenpaullone, 1-azakenpaullone, SB415286 (3-[(3-chloro-4-hydroxyphenyl)-amino]-4-(2-nitrophenyl)-1H-pyrrol-2,5-dione), AR-AO144-18 (1-[(4-methoxyphenyl) methyl]-3-(5-nitro-1,3-thiazol-2-yl)urea), CT99021, CT20026, BIO ((2'Z,3'E)-6-bromoindirubin-3'-oxime), BIO-acetoxime, pyridocarbazole-cyclopentadienyl ruthenium complexes, OTDZT, alpha-4-dibromoacetophenone, and lithium. Two or more of these GSK3β inhibitors may be used in combinations.

The GSK3β inhibitor is not limited to these substances. For example, an antisense oligonucleotide or siRNA against GSK3β mRNA, an antibody binding to GSK3β, or a dominant negative GSK3β mutant can also be used as the GSK3β inhibitor. These GSK3β inhibitors are commercially available or can be synthesized according to a known method.

The concentration of the GSK3β inhibitor in the medium in this step is appropriately adjusted depending on the type of the GSK3β inhibitor to be added. The concentration can be, for example, 0.1 to 10 µM, preferably 0.5 to 2 µM.

In the case of using CHIR99021 as the GSK3β inhibitor, its concentration in the medium can be, for example, 0.1 to 10 µM, preferably 0.5 to 2 µM, particularly preferably about 1 µM.

The medium in this step may further comprise any one or more of retinoic acid (RA) and/or a derivative thereof (hereinafter, also simply referred to as "RA, etc."), glial cell line derived neurotrophic factor (GDNF), and Matrigel®.

Retinol, retinal, retinoin, isoretinoin, alitretinoin, etretinate, acitretin, tazarotene, bexarotene, or adapalene may be used as the derivative of retinoic acid (RA). Two or more of these derivatives may be used in combinations.

The concentration of RA, etc. in the medium in this step is appropriately adjusted depending on the type of the RA, etc. to be added. The concentration can be, for example, 0.001 to 50 µM, preferably 0.1 to 10 µM.

In the case of using RA as RA, etc., its concentration in the medium can be, for example, 0.001 to 50 µM, preferably 0.1 to 10 µM, particularly preferably about 1 µM.

The concentration of GDNF in the medium in this step can be, for example, 1 to 1000 ng/mL, preferably 50 to 200 ng/mL.

The concentration of Matrigel® in the medium in this step is, for example, 0.2 to 20% (v/v), preferably 1-4% (v/v), particularly preferably about 2% (v/v).

The basal medium is not particularly limited. For example, a mixture of solutions A and B of Stem Fit® AK03 (Ajinomoto Healthy Supply Co., Inc.), TeSR® 1 medium and Chemically Defined Medium (CDM) medium are suitably used. In addition, for example, BME medium, BGJb medium, CMRL 1066 medium, Glasgow MEM medium, improved MEM (IMEM) medium, improved MDM (IMDM) medium, Medium 199 medium, Eagle MEM medium, αMEM medium, DMEM medium (high glucose or low glucose), DMEM/F12 medium, Ham's medium, RPMI 1640 medium, Fischer's medium, and mixed media thereof may be used.

The CDM medium is not particularly limited. For example, a medium prepared from Iscove's modified Dulbecco's medium (manufactured by GE Healthcare Japan Corp.) may be used.

The basal medium may be supplemented with a substance for use in usual cell culture, such as apotransferrin, monothioglycerol, bovine serum albumin (BSA), insulin and/or an antibiotic.

ENPs can be cultured for proliferation with their multipotency maintained by culturing the ENPs in a medium comprising an ERBB3 agonist and/or an ERBB4 agonist and preferably further comprising any one or more of a TGFβ inhibitor, a GSK3β inhibitor, RA, etc., GDNF and Matrigel®.

The culture period in this step can be a period in which ENPs proliferate to attain the cell number of interest. This culture period is not particularly limited and can be, for example, 7 days or longer, 10 days or longer, 14 days or longer, 20 days or longer, 25 days or longer, 30 days or longer, 40 days or longer, 50 days or longer, 60 days or longer, 70 days or longer, 80 days or longer, 90 days or longer, 7 to 100 days, or 100 days or longer.

The proliferation rate of the cells in this period achieves a rate as very high as about 75 hours in terms of a cell doubling time.

This step is preferably performed by adherent culture and may be performed by suspension culture.

For the adherent culture, a culture container, for example, a dish, a flask, a microplate, or a cell culture sheet such as OptiCell (product name, Nunc), is used.

The container for use in adherent culture may be surface-treated in order to improve adhesiveness to cells (hydrophilicity), or coated with a substrate for cell adhesion such as collagen, gelatin, poly-L-lysine, poly-D-lysine, laminin, fibronectin, Matrigel®, or vitronectin. A container without such surface treatment or coating is more preferably used.

In the suspension culture, the cells are dispersed into a medium, and an aggregated cell mass is formed while medium components and the internal oxygen concentration of the medium are uniformized by stirring or shaking. The suitable stirring rate is appropriately set according to a cell density and the size of a culture container. Excessive stirring or shaking places physical stress on the cells and inhibits aggregated cell mass formation. Thus, the stirring or shaking rate is controlled so as to be able to uniformize medium components and the internal oxygen concentration of the medium and so as not to inhibit aggregated cell mass formation. The suspension culture may be performed by still standing without stirring or shaking.

For the suspension culture, it is preferred to use a container with low-adhesion coating such as PrimeSurface® (product name, Sumitomo Bakelite Co., Ltd.).

The culture temperature is not particularly limited and can be 30 to 40° C. (for example, 37° C.). A carbon dioxide concentration in the culture container can be on the order of, for example, 5%.

[Production Method According to Second Embodiment (Method Involving Differentiation of NCCs into ENPs and Proliferation of ENPs)]

Second Embodiment; Step (B1): Step of Providing Neural Crest Cells

In this step, NCCs are provided. In this step, at least NCCs can be provided. A single NCC cell, a cell population of NCCs or a cell population comprising NCCs may be provided.

The NCCs to be provided in this step may be commercially obtained NCCs, may be NCCs separated from a living body, or may be NCCs obtained by the differentiation of stem cells, etc. The commercially obtained NCCs may be NCCs in a cultured state or may be NCCs in a frozen state. When the NCCs are NCCs obtained by the differentiation of stem cells, etc., the NCCs may also be in a cultured state or in a frozen state.

Examples of the commercially available NCCs include Human Hair Follicle Outer Root Sheath Cells (manufactured by Cosmo Bio Co., Ltd.) and 09-1 Mouse Cranial Neural Crest Cell Line (manufactured by Merck Millipore).

NCCs reportedly exist in mammalian living bodies, for example, human embryonic neural tube around 30 days after fertilization, mouse embryonic neural tube around the 9th fetal day, and human, swine and rodent adult skin (Betters et al., Developmental biology, 2010, 344 (2): 578-592; Jiang et al., Development, 2000, 127 (8): 1607-1616; Dupin et al., Developmental biology, 2012, 366 (1): 83-95; and Nagoshi et al., Cell Stem Cell 2, April 2008, 392-403). NCCs may be collected by use of a known method (for example, Motohashi et al., Biology open, 2016, 5: 311-322; and Pfaltzgraff et al., Journal of Visualized Experiments, 2012, 64: 4134) and subjected to this step.

Examples of the stem cells for use in differentiation into NCCs include pluripotent stem cells. The "pluripotent stem cells" that may be used in the present invention refer to stem cells that can differentiate into tissues and cells having various different shapes and functions and have the ability to differentiate into cells of any lineage of the 3 germ layers (endoderm, mesoderm, and ectoderm). Examples thereof include, but are not particularly limited to, embryonic stem cells (ESCs), embryonic stem cells derived from cloned embryos obtained by nuclear transplantation, spermatogonial stem cells, embryonic germ cells, and induced pluripotent stem cells (herein also referred to as "iPSCs"). The "multipotent stem cells" that may be used in the present invention refer to stem cells having the ability to be able to differentiate into plural and limited numbers of linages of cells. Examples of the "multipotent stem cells" that may be used in the present invention include dental pulp stem cells, oral mucosa-derived stem cells, hair follicle stem cells, and somatic stem cells derived from cultured fibroblasts or bone marrow stem cells. The pluripotent stem cells are preferably ESCs and iPSCs.

Available "ESCs" include murine ESCs such as various murine ESC lines established by inGenious Targeting Laboratory, Riken (Institute of Physical and Chemical Research), and the like, and human ESCs such as various human ESC lines established by University of Wisconsin, NIH, Riken, Kyoto University, National Center for Child Health and Development, Cellartis, and the like. For example, CHB-1 to CHB-12 lines, RUES1 line, RUES2 line, and HUES1 to HUES28 lines distributed by ESI Bio, H1 line and H9 line distributed by WiCell Research, and KhES-1 line, KhES-2 line, KhES-3 line, KhES-4 line, KhES-5 line, SSES1 line, SSES2 line, and SSES3 line distributed by Riken can be used as the human ESC lines.

The "induced pluripotent stem cells" refer to cells that are obtained by reprograming mammalian somatic cells or undifferentiated stem cells by introducing particular factors (nuclear reprogramming factors). At present, there are various "induced pluripotent stem cells" and iPSCs established by Yamanaka, et al. by introducing the 4 factors Oct3/4, Sox2, Klf4, c-Myc into murine fibroblasts (Takahashi K, Yamanaka S., Cell, (2006) 126: 663-676); iPSCs derived from human cells, established by introducing similar 4 factors into human fibroblasts (Takahashi K, Yamanaka S., et al. Cell, (2007) 131: 861-872.); Nanog-iPSCs established by sorting cells using expression of Nanog as an indicator after introduction of the 4 factors (Okita, K., Ichisaka, T., and Yamanaka, S. (2007). Nature 448, 313-317.); iPSCs produced by a method not using c-Myc (Nakagawa M, Yamanaka S., et al. Nature Biotechnology, (2008) 26, 101-106); iPSCs established by introducing 6 factors by a virus-free method (Okita K et al. Nat. Methods 2011 May; 8(5): 409-12, Okita K et al. Stem Cells. 31 (3) 458-66); and the like may be also used. Also, induced pluripotent stem cells established by introducing the 4 factors OCT3/4, SOX2, NANOG, and LIN28 by Thomson et al. (Yu J., Thomson J A. et al., Science (2007) 318: 1917-1920.); induced pluripotent stem cells produced by Daley et al. (Park I H, Daley G Q. et al., Nature (2007) 451: 141-146); induced pluripotent stem cells produced by Sakurada et al. (Japanese Unexamined Patent Application Publication No. 2008-307007) and the like may be used.

In addition, any of induced pluripotent stem cells known in the art described in all published articles (for example, Shi Y., Ding S., et al., Cell Stem Cell, (2008) Vol 3, Issue 5, 568-574; Kim J B., Scholer H R., et al., Nature, (2008) 454, 646-650; Huangfu D., Melton, D A., et al., Nature Biotechnology, (2008) 26, No. 7, 795-797) or patents (for example, Japanese Unexamined Patent Application Publication No. 2008-307007, Japanese Unexamined Patent Application Publication No. 2008-283972, US2008-2336610, US2009-047263, WO2007-069666, WO2008-118220, WO2008-124133, WO2008-151058, WO2009-006930, WO2009-006997, WO2009-007852) may be used.

Available induced pluripotent cell lines include various iPSC lines established by NIH, Riken, Kyoto University and the like. Examples of such human iPSC lines include HiPS-RIKEN-1A line, HiPS-RIKEN-2A line, HiPS-RIKEN-12A line, and Nips-B2 line from Riken, and 253G1 line, 201B7 line, 409B2 line, 454E2 line, 606A1 line, 610B1 line, 648A1 line, 1231A1 line and 1231A3 line from Kyoto University. 1231A1 line and 1231A3 line are preferred, and 1231A3 line is more preferred.

The differentiation of stem cells into NCCs can be performed according to a known method described in a literature (for example, Non Patent Literature 2). Exemplary steps for allowing human iPSCs to differentiate into NCCs are shown in FIG. 1. First, iPSCs are seeded to a dish or the like, adherent-cultured, and then adherent-cultured in a medium comprising a TGFβ inhibitor and a GSK3β inhibitor (FIG. 1, step i), and thereby allowed to differentiate into NCCs by adherent culture in a medium further supplemented with RA and/or a derivative thereof (step ii).

The concentration of the TGFβ inhibitor in the medium in this step is appropriately adjusted depending on the type of the TGFβ inhibitor to be added. The concentration can be, for example, 0.1 to 50 μM, preferably 1 to 20 μM.

In the case of using SB431542 (4-[4-(1,3-benzodioxol-5-yl)-5-(2-pyridinyl)-1H-imidazol-2-yl]-benzamide) as the TGFβ inhibitor, its concentration in the medium can be, for example, 1 to 100 µM, preferably 5 to 20 µM, particularly preferably about 10 µM.

The concentration of the GSK3β inhibitor in the medium in this step is appropriately adjusted depending on the type of the GSK3β inhibitor to be added. The concentration can be, for example, 0.1 to 10 µM, preferably 0.5 to 2 µM.

In the case of using CHIR99021 as the GSK3β inhibitor, its concentration in the medium can be, for example, 0.1 to 10 µM, preferably 0.5 to 2 µM, particularly preferably about 1 µM.

The stem cells can be allowed to differentiate into cranial neural crest cells (cranial NCCs), vagal neural crest cells (vagal NCCs), trunk neural crest cells (trunk NCCs), or sacral neural crest cells (sacral NCCs) according to the concentration of RA, etc. in the medium in step ii.

For example, in the case of allowing human iPSCs to differentiate into cranial neural crest cells, RA, etc. is not added.

In the case of allowing human iPSCs to differentiate into vagal neural crest cells or trunk neural crest cells, the concentration of RA, etc. in the medium is, for example, 0.001 to 50 µM, preferably 0.1 to 10 µM.

However, the concentration of RA, etc. in the medium is appropriately adjusted depending on the type of the RA, etc. to be added.

For obtaining ENPs having high differentiation capacity into enteric nerve cells and glial cells in the subsequent step (B2), differentiation into vagal neural crest cells (vagal NCCs) is preferred.

The culture period in a medium comprising a TGFβ inhibitor and a GSK3β inhibitor (FIG. 1, step i) can be, for example, 0 to 12 days and can be, particularly, about 6 days.

The culture period in a medium further supplemented with RA, etc. (step ii) can be, for example, 1 to 12 days and can be, particularly, about 5 days.

The basal medium mentioned above can be used.

The culture container mentioned above can be used in the adherent culture.

The culture container is preferably surface-treated in order to improve adhesiveness to cells (hydrophilicity), or coated with a substrate for cell adhesion such as collagen, gelatin, poly-L-lysine, poly-D-lysine, laminin, fibronectin, Matrigel®, or vitronectin.

The culture temperature is not particularly limited and is 30 to 40° C. (for example, 37° C.). A carbon dioxide concentration in the culture container is, for example, about 5%.

Second Embodiment; Step (B2): Step of Culturing Neural Crest Cells

In this step, the NCCs are cultured in a medium comprising an ERBB3 agonist and/or an ERBB4 agonist, and retinoic acid and/or a derivative thereof (FIG. 1, step iii). The NCCs used here are preferably vagal neural crest cells (vagal NCCs).

The ERBB3 agonist, the ERBB4 agonist and RA, etc. used and their concentrations in the medium can be the same as in the step (A2).

The medium may further comprise a TGFβ inhibitor and/or a GSK3β inhibitor.

The TGFβ inhibitor and the GSK3β inhibitor used and their concentrations in the medium can be the same as in the step (A2).

The medium may further comprise any one or more of GDNF and Matrigel®.

The concentrations of GDNF and Matrigel® in the medium and the basal medium used can also be the same as in the step (A2).

This step is preferably performed by adherent culture and may be performed by suspension culture, as in the step (A2).

ENPs can be allowed to proliferate with their multipotency maintained by culturing the ENPs in a medium comprising an ERBB3 agonist and an ERBB4 agonist and RA, etc. and preferably further comprising any one or more of a TGFβ inhibitor, a GSK3β inhibitor, GDNF and Matrigel®.

The culture period in this step can be a period in which ENPs proliferate to attain the cell number of interest. This culture period is not particularly limited and can be, for example, 7 days or longer, 10 days or longer, 14 days or longer, 20 days or longer, 25 days or longer, 30 days or longer, 40 days or longer, 50 days or longer, 60 days or longer, 70 days or longer, 80 days or longer, 90 days or longer, 7 to 100 days, or 100 days or longer.

The proliferation rate of the cells in this period achieves a rate as high as about 75 hours in terms of a cell doubling time.

[Expansion Culture Method According to Third Embodiment]

Third Embodiment; Step (C1): Step of Providing Enteric Neural Precursors

In this step, ENPs are provided.

The ENPs to be provided in this step can be the same as in the step (A1).

Third Embodiment; Step (C2): Step of Culturing Enteric Neural Precursors

In this step, the ENPs are cultured in a medium comprising an ERBB3 agonist and/or an ERBB4 agonist.

The ERBB3 agonist and/or the ERBB4 agonist used and their concentrations in the medium can be the same as in the step (A2).

The medium may further comprise a TGFβ inhibitor and a GSK3β inhibitor.

The TGFβ inhibitor and the GSK3β inhibitor used and their concentrations in the medium can be the same as in the step (A2).

The medium may further comprise any one or more of RA, etc., glial cell line derived neurotrophic factor (GDNF), and Matrigel®.

The RA, etc. used and the concentration of the RA, etc. to be added can be the same as in the step (A2).

The concentrations of GDNF and Matrigel® in the medium and the basal medium used can also be the same as in the step (A2).

This step is preferably performed by adherent culture and may be performed by suspension culture, as in the step (A2).

ENPs can be cultured for proliferation with their multipotency maintained by culturing the ENPs in a medium comprising an ERBB3 agonist and/or an ERBB4 agonist and RA, etc. and preferably further comprising any one or more of a TGFβ inhibitor, a GSK3β inhibitor, GDNF and Matrigel®.

The culture period in this step can be a period in which ENPs proliferate to attain the cell number of interest. This culture period is not particularly limited and can be, for example, 7 days or longer, 10 days or longer, 14 days or longer, 20 days or longer, 25 days or longer, 30 days or longer, 40 days or longer, 50 days or longer, 60 days or longer, 70 days or longer, 80 days or longer, 90 days or longer, 7 to 100 days, or 100 days or longer.

The proliferation rate of the cells in this period achieves a rate as high as about 75 hours in terms of a cell doubling time.

[Enteric Neural Precursor Medium]

The present invention also provides an ENP medium for use in the method for producing ENPs or the expansion culture method mentioned above. Preferred composition of the medium is as mentioned above. The production of ENPs may include the differentiation of stem cells such as iPSCs, ESC and NCCs into ENPs.

In one aspect of the present invention, the enteric neural precursor medium comprises an ERBB3 agonist and/or an ERBB4 agonist. In another aspect of the present invention, the enteric neural precursor medium may comprise an ERBB3 agonist and/or an ERBB4 agonist as well as a TGFβ inhibitor and/or a GSK3β inhibitor and preferably comprises a TGFβ inhibitor and a GSK3β inhibitor. In an alternative aspect of the present invention, the enteric neural precursor medium may comprise an ERBB3 agonist and/or an ERBB4 agonist as well as GDNF. In an alternative aspect of the present invention, the enteric neural precursor medium may comprise an ERBB3 agonist and/or an ERBB4 agonist as well as Matrigel®. In an alternative aspect of the present invention, the enteric neural precursor medium may comprise an ERBB3 agonist and/or an ERBB4 agonist as well as GDNF and Matrigel®. In an alternative aspect of the present invention, the enteric neural precursor medium may comprise an ERBB3 agonist and/or an ERBB4 agonist as well as a TGFβ inhibitor, a GSK3β inhibitor, GDNF and Matrigel®. These enteric neural precursor media may further comprise RA, etc. The concentrations of the ERBB3 agonist and/or the ERBB4 agonist, the TGFβ inhibitor, the GSK3β inhibitor, GDNF, Matrigel® and RA, etc. in the enteric neural precursor medium can each be the same as in the step (A2).

In an alternative aspect, the present invention also provides an ENP medium additive comprising an ERBB3 agonist and/or an ERBB4 agonist, and use of an ERBB3 agonist and/or an ERBB4 agonist for ENP expansion culture.

[Enteric Neural Precursors]

The method for producing ENPs or the expansion culture method according to the present invention can produce large amounts of ENPs that maintain their differentiation capacity into enteric nerve cells and glial cells (multipotency).

The "ENPs that maintain multipotency" can be evaluated by a plurality of methods. Examples of the methods include, but are not particularly limited to, a method of causing the differentiation of the ENPs to be evaluated into enteric nerve cells and glial cells. Provided that the ENPs to be evaluated can actually be differentiated into enteric nerve cells and glial cells, the ENPs to be evaluated can be determined as the "ENPs that maintain multipotency".

Another example of the method includes a method of measuring the expression of a marker protein or gene. Provided that transcription factors SOX10 and PHOX2B are expressed in the ENPs to be evaluated, the ENPs to be evaluated can be determined as the "ENPs that maintain multipotency".

SOX10 and PHOX2B can be detected by use of immunological assay, for example, ELISA, immunostaining, or flow cytometry, using an antibody specific for the marker protein. The marker gene can be detected by use of a method of amplifying and/or detecting nucleic acid known in the art, for example, RT-PCR, microarray, or biochip. When the cells have an insert of a nucleotide sequence encoding a reporter protein (for example, Nano-Lantern (Saito K. et al., "Luminescent proteins for high-speed single-cell and whole-body imaging." Nat. Commun., 2012; 3: 1262)) downstream of the SOX10 and PHOX2B genes and express the reporter protein or its fusion protein of SOX10, etc. under the control of SOX10 promoter or the like, a method for detecting the reporter protein (for example, measuring fluorescence intensity) may be used.

[Cell Medicament and Frozen Stock]

ENPs obtained by the production method or the expansion culture method according to the present invention may be applied to a cell medicament for the prevention or treatment of a disease caused by deficiency or abnormality in enteric nerve cells. Examples of such a disease include Hirschsprung disease, esophagus achalasia, gastroparesis, congenital hypertrophic pyloric stenosis, chronic idiopathic intestinal pseudo-obstruction, neuropathic constipation and Chagas' disease.

The ENPs contained in the cell medicament may be, for example, cells recovered by detaching cells during culture or may be cells frozen in a cryopreservation solution. Cells in the same lot obtained by expansion culture are preferably cryopreserved in small portions and used, for example, because similar working effects are stably obtained and because handleability is excellent.

The cell medicament may contain other components such as a pharmaceutically acceptable carrier or additive appropriate for a purpose or a form according to a routine method. Examples of the carrier or the additive include tonicity agents, thickeners, sugars, sugar alcohols, antiseptics (preservatives), germicides or antimicrobial agents, pH adjusters, stabilizers, chelating agents, oil bases, gel bases, surfactants, suspending agents, fluidizers, dispersants, buffers, and antioxidants.

The cell medicament provides a method for treating the disease, comprising administering a therapeutically effective amount of the cell medicament to a patient.

The therapeutically effective amount is the amount of ENPs that can produce a therapeutic effect on the disease by the administration of the ENPs to a patient as compared with a control without the administration. Specifically, the therapeutically effective amount may be appropriately set depending on the dosage form of ENPs, an administration method, the purpose of use, and the age, body weight, symptoms, etc. of a patient. The effective amount per course of treatment in a human (for example, an adult human) is, for example, 200,000 to 1,00,000,000 cells/kg body weight. These cells may be dispersed in a state of single cells, may be a cell mass (sphere) in which a plurality of cells have gathered, or may be a mixture thereof.

Examples of the method for administering the cell medicament include intraperitoneal injection, subcutaneous injection, injection into the lymph node, intravenous injection, intrathoracic injection, direct injection to a local gastrointestinal organ (for example, the esophagus, the stomach, the duodenum, the small intestine, the jejunum, the ileum, the colon, and the rectum) by opening the abdomen, and administration into the rectal cavity.

The present invention also provides a frozen stock comprising ENPs obtained by the production method or the expansion culture method mentioned above.

The frozen stock can be produced by separating the obtained ENPs from the medium by centrifugation, and suspending the ENPs in a cryopreservation solution for freezing. A conventional reagent for use in the cryopreservation of cells can be used as the cryopreservation solution. For example, Cryostem Freezing Medium (trade name) and STEM-CELLBANKER® GMP Grade (Nippon Zenyaku Kogyo Co., Ltd.) are commercially available.

The frozen stock may be used as a starting material for causing the differentiation of ENPs to obtain enteric nerve cells and glial cells. Also, the frozen stock may be used for preparing tissue models having ENPs as a constituent.

[Induction of Enteric Neural Precursors into Enteric Nerve Cells or Glial Cells]

The obtained ENPs and nerve cells and glial cells obtained by the differentiation thereof by a known approach described in a literature may be useful as a cell preparation for regenerative medicine and may also be suitably used in the construction of various screening systems.

For the induction of ENPs into enteric nerve cells, see, for example, Non Patent Literature 2. Also, a conventionally known approach (for example, "A novel bidirectional interaction between endothelin-3 and retinoic acid in rat enteric nervous system precursors", Gisser, J. M. et al., PLosOne 2013) can be applied to the induction of ENPs into glial cells.

[Method for Producing Intestinal Organoid or Artificial Intestinal Tract]

The method for producing an intestinal organoid according to the present invention comprises the step of coculturing ENPs and hindgut cells.

The ENPs can be those obtained by the method for producing ENPs or the expansion culture method mentioned above.

The hindgut cells can be obtained by the differentiation of stem cells according to a conventionally known approach. An exemplary approach involves culturing human induced pluripotent stem cells in a medium containing activin A, BMP4 and bFGF to obtain the definitive endoderm, and culturing the definitive endoderm in a medium containing FGF4 and a GSK3β inhibitor to obtain hindgut cells.

The basal medium mentioned above can also be used as a basal medium for definitive endoderm induction and for hindgut cell induction.

The concentration of activin A in the medium for definitive endoderm induction can be, for example, 10 to 1000 ng/mL, preferably 50 to 500 ng/mL, more preferably about 100 ng/mL. The concentration of BMP4 in the medium can be, for example, 1 to 100 ng/mL, preferably 5 to 50 ng/mL, more preferably about 10 ng/mL. The concentration of bFGF in the medium can be, for example, 1 to 200 ng/mL, preferably 5 to 100 ng/mL, more preferably about 20 ng/mL. The culture period may be, for example, 1 to 10 days, preferably 2 to 6 days, more preferably about 4 days.

The concentration of FGF4 in the medium for hindgut cell induction can be, for example, 10 to 1000 ng/mL, preferably 50 to 500 ng/mL, more preferably about 100 ng/mL. In the case of using, for example, CHIR99021, the concentration of the GSK3β inhibitor in the medium can be, for example, 1 to 30 μM, preferably 4 to 10 μM, more preferably about 6 M. The culture period may be, for example, 4 to 12 days, preferably 6 to 10 days, more preferably about 8 days.

A conventionally known approach of producing an intestinal organoid by the coculture of NCCs and hindgut cells can be appropriately modified and applied to the coculture of ENPs and hindgut cells.

An exemplary approach involves inoculating hindgut cells and ENPs suspended in a Matrigel® solution to a plate for gelation, and adding thereto a medium containing R-spondin-1, noggin, Wnt3a, EGF, prostaglandin-E2 and a ROCK inhibitor, followed by culture. The intestinal organoid obtained by coculture may be resuspended in a Matrigel® solution and then maturated by the reapplication of a similar approach, if necessary.

Another exemplary approach involves inoculating hindgut cells suspended in a Matrigel® solution to a plate for gelation, adding thereto a medium containing R-spondin-1, noggin, Wnt3a, EGF, prostaglandin-E2 and a ROCK inhibitor, followed by culture to obtain an intestinal organoid, then temporarily dispersing the intestinal organoid, mixing the dispersion with a cell suspension of ENPs, centrifuging the mixed solution, and culturing the resulting cell pellets in a medium containing R-spondin-1, noggin, Wnt3a, EGF, prostaglandin-E2 and a ROCK inhibitor. In this case as well, the intestinal organoid obtained by coculture may be maturated, if necessary.

The basal medium mentioned above can also be used as a basal medium for the coculture of ENPs and hindgut cells.

The concentration of R-spondin-1 in the medium can be, for example, 100 to 10,000 ng/mL, preferably 500 to 5000 ng/mL, more preferably about 1000 ng/mL.

The concentration of noggin in the medium can be, for example, 10 to 1000 ng/mL, preferably 50 to 500 ng/mL, more preferably about 100 ng/mL.

The concentration of Wnt3a in the medium can be, for example, 10 to 1000 ng/mL, preferably 50 to 500 ng/mL, more preferably about 100 ng/mL.

The concentration of EGF in the medium can be, for example, 10 to 1000 ng/mL, preferably 50 to 500 ng/mL, more preferably about 100 ng/mL.

The concentration of prostaglandin-E2 in the medium can be, for example, 0.5 to 10 μM, preferably 1 to 5 μM, more preferably about 2.5 μM.

In the case of using, for example, Y27632, the concentration of the ROCK inhibitor can be 1 to 100 M, preferably 5 to 50 μM, more preferably about 10 μM.

The culture period may be, for example, 15 to 40 days, preferably 20 to 30 days, more preferably 24 to 25 days.

The method for producing an artificial intestinal tract according to the present invention comprises the step of transplanting the intestinal organoid thus obtained into a living body to form an artificial intestinal tract.

The transplantation into a living body is not particularly limited and can be performed, for example, by centrifuging a dispersion of the intestinal organoid, attaching the obtained cell pellets to an appropriate scaffold material, and implanting the scaffold onto intestinal membrane fat. Various commercially available scaffold materials can be used. For example, NEOVEIL® Sheet (Gunze Ltd.) or poly-L-lactide (DURECT Corp.) can be used.

The recipient animal can be a non-human mammal such as a mouse, a rat, a rabbit, a dog, a pig, cattle, a horse and a monkey, or a human animal. Preferably, a non-human mammal is selected. Also, an immunodeficient animal may be preferably used.

The intestinal organoid thus transplanted differentiates and maturates in the living body to form an artificial intestinal tract. A period necessary for differentiation and maturation may differ depending on a cell number for transplantation, the scaffold material used, the recipient animal and a site and is, for example, 5 weeks or longer, preferably 10 weeks or longer, more preferably about 13 to 20 weeks.

The resulting artificial intestinal tract comprises nerve cells and glial cells derived from ENPs and may exhibit contractile and relaxant responses to electrical stimulation.

The nerve cells in the artificial intestinal tract have functions of contracting muscle by producing acetylcholine and adrenaline, relaxing muscle by producing nitrogen monoxide, and relaxing muscle in response to electrical stimulation.

EXAMPLES

Test Example 1: Maintenance Culture of Human iPSCs

The human iPSCs used were 1231A3 line (see Scientific Reports, 2014, 4, 3594).

The iPSCs were maintenance-cultured using a plate coated with iMatrix® 511 Silk (Nippi Inc.) without the use of feeder cells. The culture was performed at 37° C. under 5% $CO_2$. The medium used for maintenance culture was a mixture of solutions A, B and C of Stem Fit® AK03N (Ajinomoto Healthy Supply Co., Inc.).

The medium was replaced every day, and the cells were passaged every 6 to 7 days. The passage was performed by preparing the iPSCs into single cells using TrypLE® Select CTS (Life Technologies Corp.) diluted 2-fold with phosphate-buffered saline (hereinafter, referred to as "PBS") supplemented with 0.5 mM EDTA, detaching the cells from the plate, and then inoculating the detached iPSCs onto a fresh plate coated with iMatrix® 511 Silk. The medium used for inoculation was a mixture of solutions A, B and C of Stem Fit® AK03N supplemented with 10 μM Y27632 (FUJIFILM Wako Pure Chemical Corp.).

Test Example 2: Establishment of SOX10::tdTomato-PHOX2B::emGFP Reporter Human iPSC Line The human iPSCs prepared as single cells were cotransfected with a SpCas9 D10A nickase expression plasmid, a SOX10 sgRNA expression plasmid, a SOX10-F2A-tdTomato donor plasmid, and a puromycin resistance gene expression plasmid (FUJIFILM Wako Pure Chemical Corp.) using Neon Transfection system (Life Technologies Corp.).

The obtained cells were subjected to drug selection by puromycin treatment, then colony pickup, and expansion culture. Among the obtained colonies, a colony confirmed to have an insert of the sequence of interest by PCR was used as a SOX10::tdTomato line.

The human iPSCs (SOX10::tdTomato line) prepared as single cells were further cotransfected with a SpCas9 D10A nickase protein, a PHOX2B gRNA (Integrated DNA Technologies, Inc. (IDT)), a PHOX2B-F2A-emGFP donor plasmid, and a puromycin resistance gene expression plasmid (FUJIFILM Wako Pure Chemical Corp.) using Neon Transfection system (Life Technologies Corp.).

The obtained cells were subjected to drug selection by puromycin treatment, then colony pickup, and expansion culture. Among the obtained colonies, a colony confirmed to have an insert of the sequence of interest by PCR was used as a SOX10::tdTomato-PHOX2B::emGFP line.

Test Example 3: Differentiation of Human iPSCs into Vagal Neural Crest Cells (1) Preculture of iPSCs Human iPSCs (SOX10::tdTomato-PHOX2B::emGFP line) maintenance-cultured by the method described in Test Example 1 were seeded at a density of 2 to $4\times10^4$ or 2.4 to $4.9\times10^5$ cells/well or dish respectively to a 6-well plate or a 10 cm dish coated with iMatrix® 511 Silk, and cultured at 37° C. for 3 to 4 days under 5% $CO_2$ (preculture). The culture solution used for inoculation was a mixture of solutions A, B and C of StemFit AK03N supplemented with 10 μM Y27632 (FUJIFILM Wako Pure Chemical Corp.).

(2) Differentiation of iPSCs into Vagal Neural Crest Cells

After preculture, the medium was replaced with a medium containing 10 μM SB431542 (FUJIFILM Wako Pure Chemical Corp.) and 1 μM CHIR99021 (Axon MedChem) (0 days of culture), and the cells were cultured at 37° C. for 6 days under 5% $CO_2$. Then, the medium was replaced with a medium further containing 1 μM retinoic acid (FUJIFILM Wako Pure Chemical Corp.), and the cells were cultured at 37° C. for 5 days under 5% $CO_2$ (a total of 11 days). The medium used here was a mixture of solutions A and B of Stem Fit® AK03N. During these culture periods, the medium was replaced every day.

Vagal neural crest cells were obtained on 11 days of culture.

Cranial neural crest cells were induced by the culture of iPSCs under the same conditions as above except that retinoic acid was not added.

In order to examine the expression of differentiation markers of vagal neural crest cells, the cells on 11 days of culture were recovered, and a total RNA fraction was purified using RNeasy® (Qiagen N.V.). cDNA was synthesized using PrimeScript™ RT reagent kit (Takara Bio Inc.). Then, quantitative RT-PCR was carried out to measure the expression levels of vagal neural crest cell markers SOX10 and endothelin receptor type B (EDNRB) and HOXB2, HOXB3, HOXB4, HOXB5, HOXB7 and HOXB9 genes among a group of HOX genes defining positional information on the anteroposterior axis. The gene expression levels were determined as ratios to the expression level of an internal control GAPDH.

Figure 2:
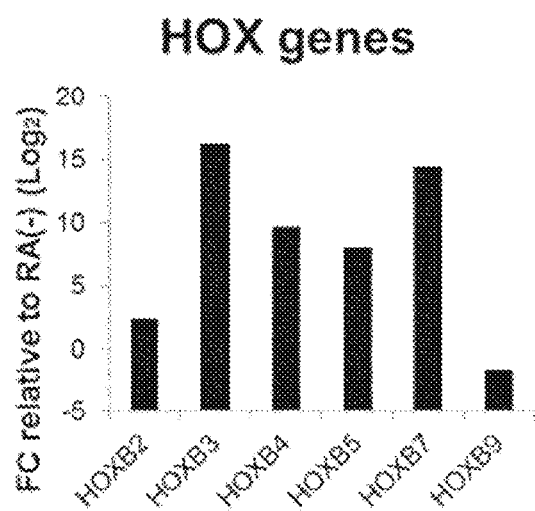
FIG. 2 is a diagram showing a gene expression profile of vagal neural crest cells obtained by the differentiation of human iPSCs.
Figure 2:
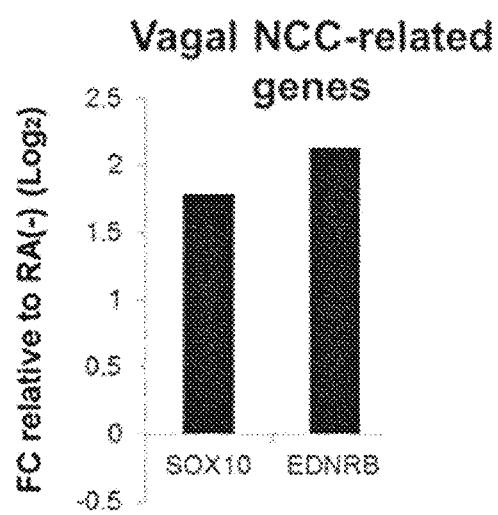

The expression level of each gene is shown in FIG. 2. In the drawing, the ordinate shows fold change (values of a ratio indicated in log 2 with the expression levels in cranial neural crest cells defined as 1). SOX10, EDNRB, HOXB2, HOXB3, HOXB4, HOXB5 and HOXB7 were expressed whereas HOXB9 was not expressed. Thus, differentiation into vagal neural crest cells was able to be confirmed.

Test Example 4: Differentiation of Vagal Neural Crest Cells into Enteric Neural Precursors and Expansion Culture Cells (vagal neural crest cells) on 11 days of culture obtained by the method of Test Example 3 were dissociated by enzymatic treatment and recovered. The enzymatic treatment was carried out as follows.

The medium was aspirated and replaced with PBS. Then, the cells were detached using a cell scraper. The detached cell mass was dissociated by pipetting in Accutase® (Innovative Cell Technologies, Inc.). Then, MACS® Buffer (Miltenyi Biotec) was added thereto, and the cells were prepared into single cells through a 40 m cell strainer. The obtained cell suspension was centrifuged at 300×g for 3 minutes. Then, the supernatant was removed, and the cells were suspended in an enteric neural precursor medium. The enteric neural precursor medium used was a mixture of solutions A and B of Stem Fit® AK03N containing 10 μM SB431542 (FUJIFILM Wako Pure Chemical Corp.), 1 μM CHIR99021 (Axon MedChem), 1 μM retinoic acid (FUJIFILM Wako Pure Chemical Corp.), 100 ng/mL neuregulin 1 (NRG1) (PeproTech, Inc.) and 50 mg/mL glial cell-derived neurotrophic factor (GDNF) (FUJIFILM Wako Pure Chemical Corp.). For adherent culture, Matrigel® (Corning Inc.) was added at 2% to the cell suspension, which was then cultured using a multiwell plate (Corning Inc.). For suspension culture, a multiwell plate (Corning Inc.) treated for low cell adhesion was used. The culture in both cases was carried out at 37° C. under 5% $CO_2$.

A passage method for adherent culture will be given below.

The medium was aspirated and replaced with PBS. Then, PBS was aspirated. TrypLE® Select CTS (Life Technologies Corp.) was added to the cells, which were then left standing at 37° C. for 10 minutes. Then, TrypLE® Select CTS was aspirated. An enteric neural precursor medium was added to the cells, which were then dissociated by pipetting.

The cells thus dissociated were seeded at a density of 2 to $10 \times 10^4$ cells/cm$^2$. Matrigel® was added at 2% (w/v) to the cells thus seeded.

The obtained cells were passaged once per 1 to 2 weeks. For each passage, an accumulated cell number, a live cell number and a dead cell number was counted using an automatic cell counter. The accumulated cell number was calculated from a live cell number seeded for each passage and a live cell number obtained by the next passage.

Figure 3:
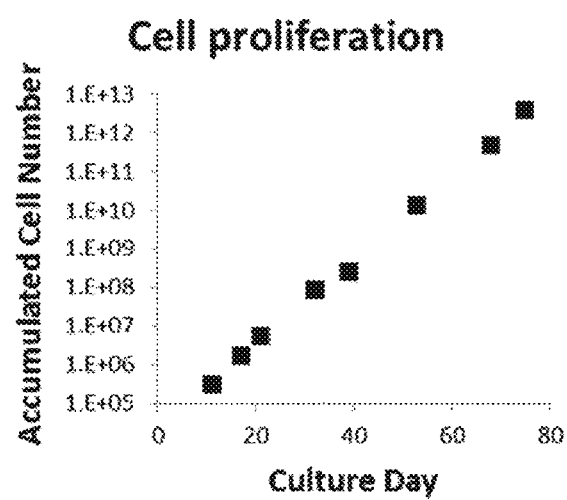
FIG. 3 is a diagram showing time-dependent change in accumulated cell number when vagal neural crest cells were subcultured in an enteric neural precursor medium.

Time-dependent change in accumulated cell number is shown in FIG. 3. The cells were capable of being passaged at least 7 times and exhibited linear cell proliferation.

Test Example 5: Flow Cytometry Analysis on Enteric Neural Precursors

The expression of SOX10-tdTomato and PHOX2B-emGFP in the cells cultured in Test Example 4 was analyzed for each passage by use of flow cytometry.

The cell dispersion obtained by each passage was centrifuged at 300×g for 3 minutes. After removal of the supernatant, the cells were suspended in HBSS containing DAPI and 1% bovine serum albumin and analyzed using FACS Aria Fusion (Becton Dickinson Japan).

Figure 4B:
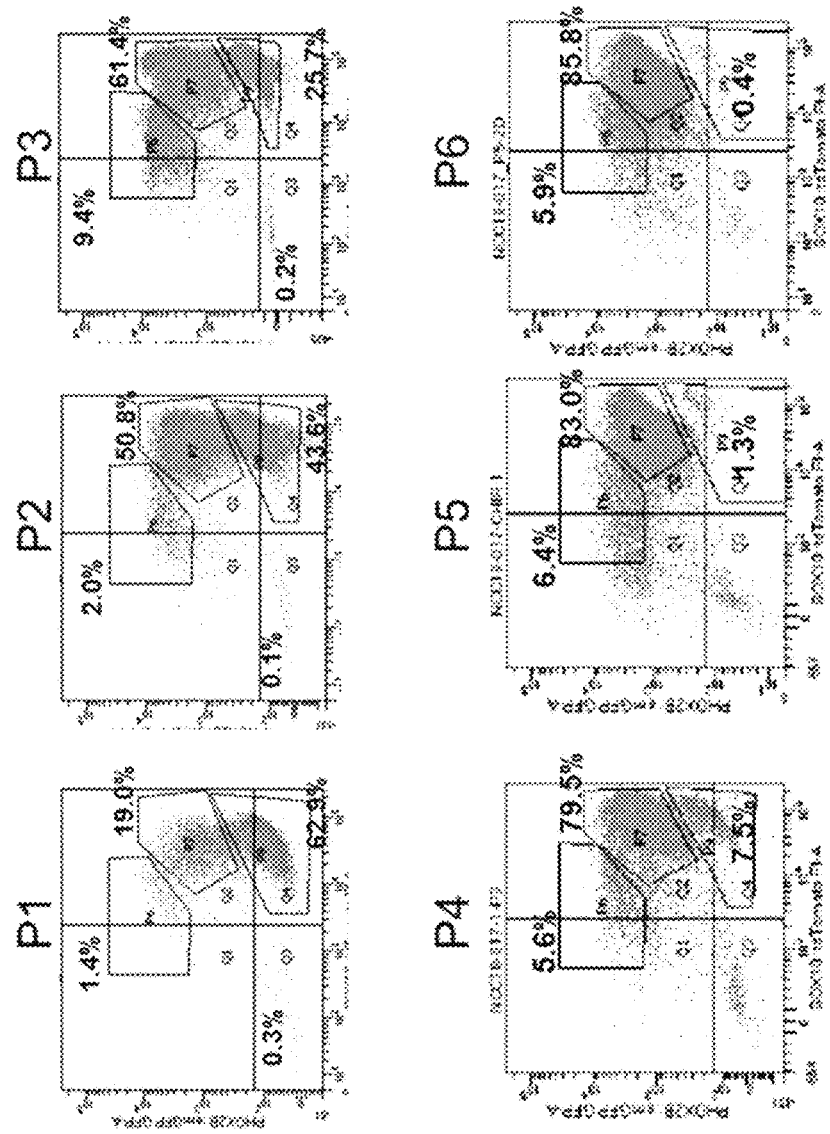
FIG. 4(B) shows the expression of SOX10-tdTomato and PHOX2B-emGFP in enteric neural precursors at the number of passages (1 to 6 passages).
Figure 4A:
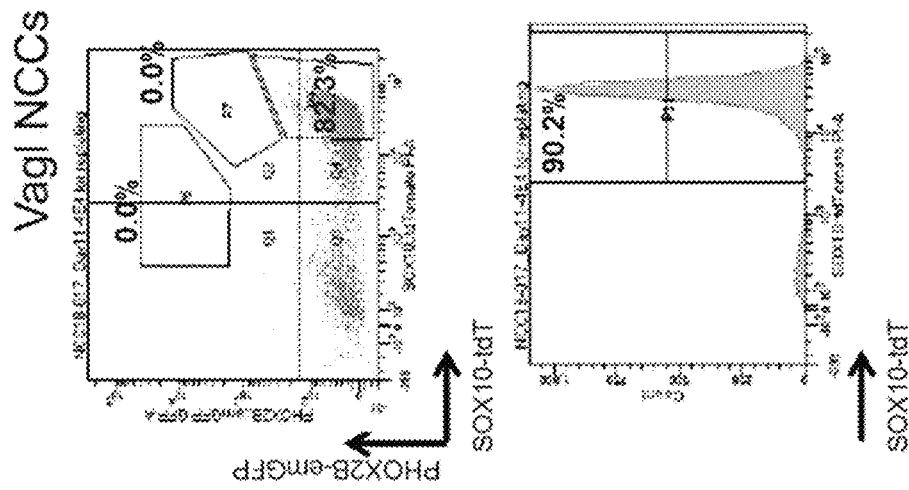
FIG. 4(A) shows the expression of SOX10-tdTomato and PHOX2B-emGFP in vagal neural crest cells on 11 days of culture.

The results of analyzing the expression of SOX10-tdTomato and PHOX2B-emGFP are shown in FIG. 4. In the drawing, P1 to P6 mean the number of passages (1 to 6 passages). The proportion of enteric neural precursors coexpressing SOX10-tdTomato and PHOX2B-emGFP was elevated with increase in the number of passages. The proportion of the enteric neural precursors was 80% or more at the 5th or later passage.

Test Example 6: Study on Composition of Enteric Neural Precursor Medium

Vagal neural crest cells were cultured in an enteric neural precursor medium under the same conditions as in Test Example 4 except that NRG1 and/or GDNF was not added to the enteric neural precursor medium. The cells were observed under a fluorescence microscope (BZ-X700, Keyence Corp.). Also, flow cytometry analysis was conducted by the same method as in Test Example 5.

Figure 5:
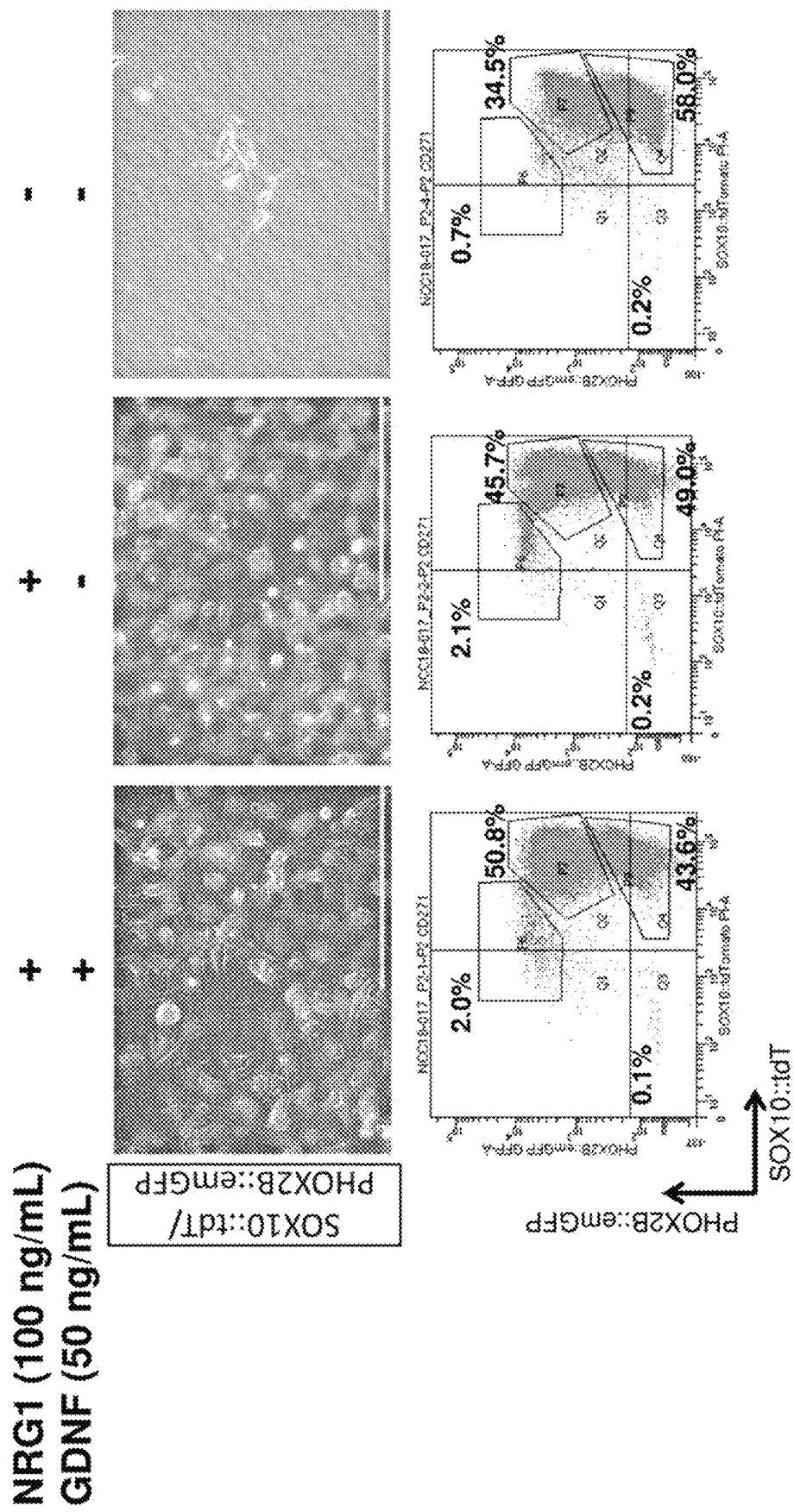
FIG. 5 is a diagram showing fluorescent images of cells obtained by culturing vagal neural crest cells in an enteric neural precursor medium or this medium except for NRG1 or GDNF, and results of expression analysis on SOX10-tdTomato and PHOX2B-emGFP by flow cytometry. In the fluorescent images, the red color depicts the fluorescence of SOX10-tdTomato, and the green color depicts the fluorescence of PHOX2B-emGFP.

The fluorescent images of the cells and the results of analyzing the expression of SOX10-tdTomato and PHOX2B-emGFP are shown in FIG. 5. Under the NRG1-free conditions, cell proliferation was very slow, and a cell number necessary for conducting flow cytometry was not obtained. Under the GDNF-free conditions, cell proliferation was slower than that under the conditions involving GDNF, though enteric neural precursors coexpressing SOX10-tdTomato and PHOX2B-emGFP were obtained.

Test Example 7: Gene Expression Analysis on Enteric Neural Precursors

Total RNA was extracted from cells obtained by passages in Test Example 4, and the gene expression of enteric neural precursor markers SOX10, PHOX2B, HOXB5, EDNRB and ret proto-oncogene (RET) was confirmed. The gene expression analysis was conducted in the same way as the method mentioned above.

Figure 6:
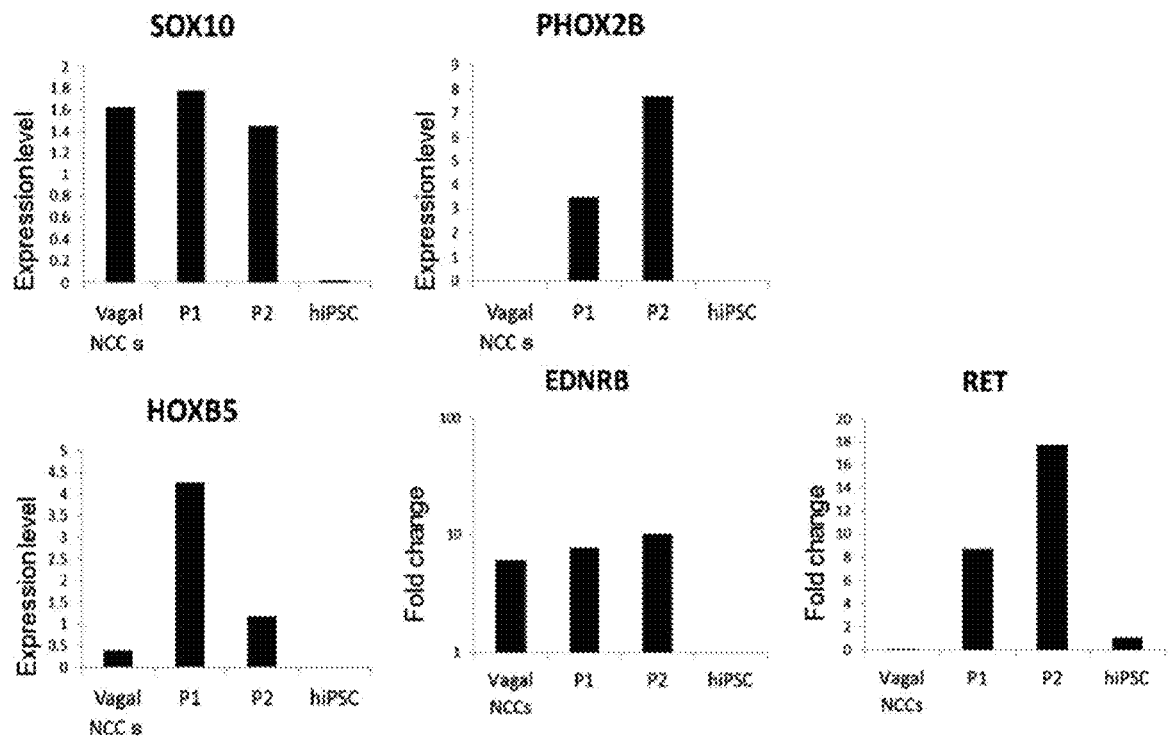
FIG. 6 is a diagram showing a gene expression profile of cells obtained by culturing vagal neural crest cells in an enteric neural precursor medium. EDNRB and RET represent "endothelin receptor type B" and "ret proto-oncogene", respectively.

The results are shown in FIG. 6. In the drawing, the ordinate shows expression levels (ratios to the expression level of an endogenous control GAPDH) or fold change (values of a ratio indicated in log 2 with the expression levels in iPSCs defined as 1). The cells cultured in the enteric neural precursor medium expressed SOX10, PHOX2B, HOXB5, EDNRB and RET even after passages.

Test Example 8: Differentiation of Enteric Neural Precursors into Enteric Nervous System Enteric neural precursors obtained in the same way as in Test Example 4 were cultured in a medium for differentiation into enteric nerve and thereby allowed to differentiate into enteric nerve. The medium for differentiation into enteric nerve used was Neurobasal Medium (Life Technologies Corp.) supplemented with B27 (Life Technologies Corp.), N2 supplement (FUJIFILM Wako Pure Chemical Corp.), L-glutamine (FUJIFILM Wako Pure Chemical Corp.), penicillin/streptomycin (Life Technologies Corp.), 100 μM ascorbic acid (FUJIFILM Wako Pure Chemical Corp.) and 25 ng/mL GDNF.

The cells on 40 days of culture were fixed at room temperature by the addition of 4% PFA and subjected to fluorescent immunostaining in order to evaluate differentiation capacity into various enteric nerve subtypes. The cells were sequentially reacted with an anti-choline acetyltransferase (ChAT) antibody (ab224267, Abcam plc), an anti-neuronal nitric oxide synthases (nNOS) antibody (ab76067, Abcam plc), an anti-gamma-aminobutyric acid (GABA) antibody (A2052, Sigma-Aldrich Co. LLC) or an anti-5-hydroxytryptamine (5-HT) antibody (S5545, Sigma-Aldrich Co. LLC) as a primary antibody and further with an Alexa 647-labeled secondary antibody appropriate for an immunized animal of the primary antibody as a secondary antibody, and then observed under a fluorescence microscope.

Figure 7:
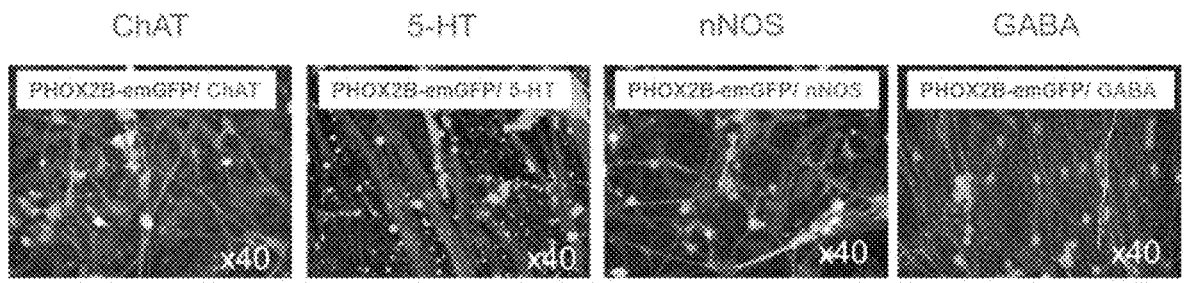
FIG. 7 shows fluorescent immunostaining images of cells obtained by culturing enteric neural precursors in an enteric nerve induction medium. In the fluorescent immunostaining images, the green color depicts the fluorescence of PHOX2B-emGFP, and the purple color depicts the expression of ChAT, nNOS, GABA or 5-HT.

The fluorescent immunostaining images are shown in FIG. 7. ChAT-, nNOS-, GABA- and 5-HT-positive nerves were confirmed and shown to have cholinergic neurons, inhibitory neurons, GABAergic neurons and serotonergic neurons, respectively. Thus, the enteric neural precursors obtained by this culture method were shown to retain differentiation capacity into various enteric nerve subtypes.

Test Example 9: Maintenance Culture of Human iPSCs

The human iPSCs used were 253G1 line (see Nature Biotechnology, 2008, 26, (1): 101-106).

The iPSCs were maintenance-cultured using a plate coated with Vitronectin (VN-N) Recombinant Human Protein, Truncated (manufactured by Thermo Fisher Scientific, Inc.) without the use of feeder cells. The culture was performed at 37° C. under 5% $CO_2$.

The medium used for maintenance culture was a mixture of Basal Medium and Supplement of Essential 8™ Flex Medium Kit (Thermo Fisher Scientific, Inc.). The medium was replaced every day, and the cells were passaged every 6 to 7 days.

The passage was performed by preparing the iPSCs into single cells using PBS supplemented with 0.5 mM EDTA, detaching the cells from the plate, and then inoculating the detached iPSCs onto a fresh plate coated with Vitronectin (VN-N) Recombinant Human Protein, Truncated.

The medium used for inoculation was a mixture of Basal Medium and Supplement of Essential 8™ Flex Medium kit supplemented with 10 µM Y27632 (FUJIFILM Wako Pure Chemical Corp.).

Test Example 10: Establishment of LGR5::emGFP Reporter Human iPSC Line

The human iPSCs prepared as single cells in Test Example 9 were cotransfected with a SpCas9 expression plasmid, a LGR5 sgRNA expression plasmid, and a LGR5::emGFP donor plasmid (construct capable of knocking-in "chimeric intron+emGFP+SV40polyA" to the N terminus of LGR5) using NEPA21 (Nepa Gene Co., Ltd).

The obtained cells were subjected to drug selection by puromycin treatment, then colony pickup, and expansion culture. Among the obtained colonies, a colony confirmed to monoallelically have an insert of the sequence of interest by PCR was used as a LGR5::emGFP line.

Test Example 11: Differentiation of Human iPSCs into Intestinal Organoid (1) Preculture of iPSCs The LGR5::emGFP line of Test Example 10 was seeded at a density of $4 \times 10^5$ cells/well to a 12-well plate coated with Matrigel® (Corning Inc.), and cultured at 37° C. for 2 days under 5% $CO_2$ (preculture). The culture solution used for inoculation was a mixture of Basal Medium and Supplement of Essential 8™ Flex Medium Kit supplemented with 10 µM Y27632.

(2) Differentiation of Human iPSCs into Definitive Endoderm

After preculture, the medium was replaced with a medium containing 100 ng/mL Activin A (PeproTech, Inc.), 10 ng/mL BMP4 (R&D Systems, Inc.), 20 ng/mL bFGF (FUJIFILM Wako Pure Chemical Corp.) (0 days of culture), and the cells were cultured at 37° C. for 4 days under 5% $CO_2$. The medium used was a mixture of RPMI 1640 (Thermo Fisher Scientific, Inc.) with B-27 Supplement, minus insulin (Thermo Fisher Scientific, Inc.) and Penicillin-Streptomycin (Thermo Fisher Scientific, Inc.). During the culture period, the medium was replaced every day.

In order to confirm differentiation into the definitive endoderm, the cells were recovered 4 days after the start of culture and confirmed by quantitative RT-PCR to express definitive endoderm markers SOX17 and FOXA2.

(3) Differentiation of Definitive Endoderm into Hindgut

After differentiation into the definitive endoderm, the medium was replaced with a medium containing 100 ng/mL FGF4 (PeproTech, Inc.) and 6 LM CHIR99021 (Axon MedChem) (4 days of culture), and the cells were cultured at 37° C. for 4 days under 5% $CO_2$ (a total of 8 days). The medium used was a mixture of RPMI 1640 (Thermo Fisher Scientific, Inc.) with B-27 Supplement, minus vitamin A (Thermo Fisher Scientific, Inc.) and Penicillin-Streptomycin (Thermo Fisher Scientific, Inc.). The whole amount of the medium was replaced on 4 days of culture, and half the amount of the medium was replaced from 5 days to 7 days of culture. In order to confirm differentiation into the hindgut, the cells were recovered 8 days after the start of culture and confirmed by quantitative RT-PCR to express a hindgut marker CDX2.

(4) Differentiation into Intestinal Organoid—1

A hindgut cell mass formed in each well was recovered together with a culture supernatant. A cell suspension containing the enteric neural precursors prepared in Test Example 4 was added to the solution containing the hindgut cell mass, and centrifuged, followed by the removal of the culture supernatant. The hindgut cell mass and the enteric neural precursors resuspended in a Matrigel® solution were seeded at 50 L/well onto a 24-well plate and cultured at 37° C. for 30 minutes under 5% $CO_2$ for gelation of Matrigel®. A medium containing 1000 ng/mL R-spondin-1 (FUJIFILM Wako Pure Chemical Corp.), 100 ng/mL noggin (PeproTech, Inc.), 100 ng/mL Wnt3a (R&D Systems, Inc.), 100 ng/mL EGF, and 2.5 M prostaglandin-E2 was added onto the gel of Matrigel®, followed by culture at 37° C. under 5% $CO_2$. The medium used was a mixture of Advanced DMEM/F-12 (Thermo Fisher Scientific, Inc.) with B-27 Supplement, minus vitamin A (Thermo Fisher Scientific, Inc.), N-2 Supplement (Thermo Fisher Scientific, Inc.), 10 µM Y27632, 10 mM HEPES (Thermo Fisher Scientific, Inc.), and Penicillin-Streptomycin (Thermo Fisher Scientific, Inc.).

D-PBS(-) (FUJIFILM Wako Pure Chemical Corp.) of 4° C. was added to Matrigel® containing an intestinal organoid obtained by the differentiation of the hindgut cell mass and the enteric neural precursors thus cultured for about 2 weeks, to dissolve the Matrigel®. The culture supernatant was removed by centrifugation. The intestinal organoid resuspended in a Matrigel® solution was seeded at 50 µL/well onto a 24-well plate and cultured at 37° C. for 30 minutes under 5% $CO_2$ for gelation of Matrigel®. A medium containing 1000 ng/mL R-spondin-1, 100 ng/mL noggin, 100 ng/mL Wnt3a, 100 ng/mL EGF, 2.5 µM prostaglandin-E2, and Y27632 was added onto the gel of Matrigel®, followed by culture at 37° C. under 5% $CO_2$ (intestinal organoid culture period: a total of 24 to 25 days).

(5) Differentiation into Intestinal Organoid—2

A hindgut cell mass formed in each well was recovered together with a culture supernatant. The culture supernatant was removed by centrifugation. The cell mass resuspended in a Matrigel® solution were seeded at 50 µL/well onto a 24-well plate and cultured at 37° C. for 30 minutes under 5% $CO_2$ for gelation of Matrigel®. A medium containing 1000 ng/mL R-spondin-1, 100 ng/mL noggin, 100 ng/mL Wnt3a, 100 ng/mL EGF, and 2.5 µM prostaglandin-E2 was added onto the gel of Matrigel®, followed by culture at 37° C. under 5% $CO_2$. The medium used was a mixture of Advanced DMEM/F-12 (Thermo Fisher Scientific, Inc.) with B-27 Supplement, minus vitamin A (Thermo Fisher Scientific, Inc.), N-2 Supplement (Thermo Fisher Scientific, Inc.), 10 µM Y27632, 10 mM HEPES (Thermo Fisher Scientific, Inc.), and Penicillin-Streptomycin (Thermo Fisher Scientific, Inc.).

D-PBS(-) of 4° C. was added to Matrigel® containing an intestinal organoid obtained by the differentiation of the hindgut cell mass thus cultured for about 2 weeks, to dissolve the Matrigel®. A cell suspension containing the enteric neural precursors prepared in Test Example 4 was added to the solution containing the intestinal organoid, and centrifuged, followed by the removal of the culture supernatant. After the removal of the supernatant, a medium containing 1000 ng/mL R-spondin-1, 100 ng/mL noggin, 100 ng/mL Wnt3a, 100 ng/mL EGF, 2.5 µM prostaglandin-E2, and 10 µM Y27632 was added to the cell pellets, followed by culture at 37° C. for 2 days under 5% $CO_2$. The intestinal organoid resuspended in a Matrigel® solution after culture was seeded at 50 µL/well onto a 24-well plate and cultured at 37° C. for 30 minutes under 5% $CO_2$ for gelation of Matrigel®. A medium containing 1000 ng/mL R-spondin-1, 100 ng/mL noggin, 100 ng/mL Wnt3a, 100 ng/mL EGF, 2.5 µM prostaglandin-E2, and Y27632 was added onto the gel of Matrigel®, followed by culture at 37° C. under 5% $CO_2$ (intestinal organoid culture period: a total of 24 to 25 days).

Test Example 12: In Vivo Formation of Artificial Intestinal Tract from Intestinal Organoid (1) Transplantation of Intestinal Organoid to Mouse Matrigel® containing the intestinal organoid obtained in Test Example 11 was dissolved by the addition of D-PBS(-) of 4° C. The solution containing the intestinal organoid was centrifuged, followed by the removal of the culture supernatant. After the removal of the culture supernatant, collagen I (Corning Inc.) was added to the cell pellets. The solution containing the cell pellets and collagen I was added to a scaffold prepared using NEOVEIL® Sheet (Gunze Ltd.) and poly-L-lactide (DURECT Corp.) so that the cell pellets were attached to the scaffold.

The abdomen of a 6-week-old immunodeficient mouse (male NOG mouse, Central Institute for Experimental Animals) was opened under anesthesia with isoflurane. The scaffold attached to the cell pellets was implanted onto intestinal membrane fat, and the opening was sutured. The mouse was raised for 13 weeks after transplantation.

(2) Collection of Transplanted Intestinal Organoid

The abdomen of the mouse was opened under anesthesia with isoflurane. An artificial intestinal tract formed on intestinal membrane fat was separated from the intestinal membrane fat and collected.

(3) Histological Analysis on Artificial Intestinal Tract

The collected artificial intestinal tract was fixed in 4% paraformaldehyde/phosphate-buffered saline (FUJIFILM Wako Pure Chemical Corp.) and subjected to fluorescent immunostaining. The artificial intestinal tract was sequentially reacted with an anti-TUBB3 antibody (Abcam plc), an anti-S100β antibody (Abcam plc), or an anti-GFAP antibody (Abcam plc) as a primary antibody and further with a fluorescently labeled secondary antibody appropriate for an immunized animal of the primary antibody as a secondary antibody, and then observed under a fluorescence microscope.

Figure 8:
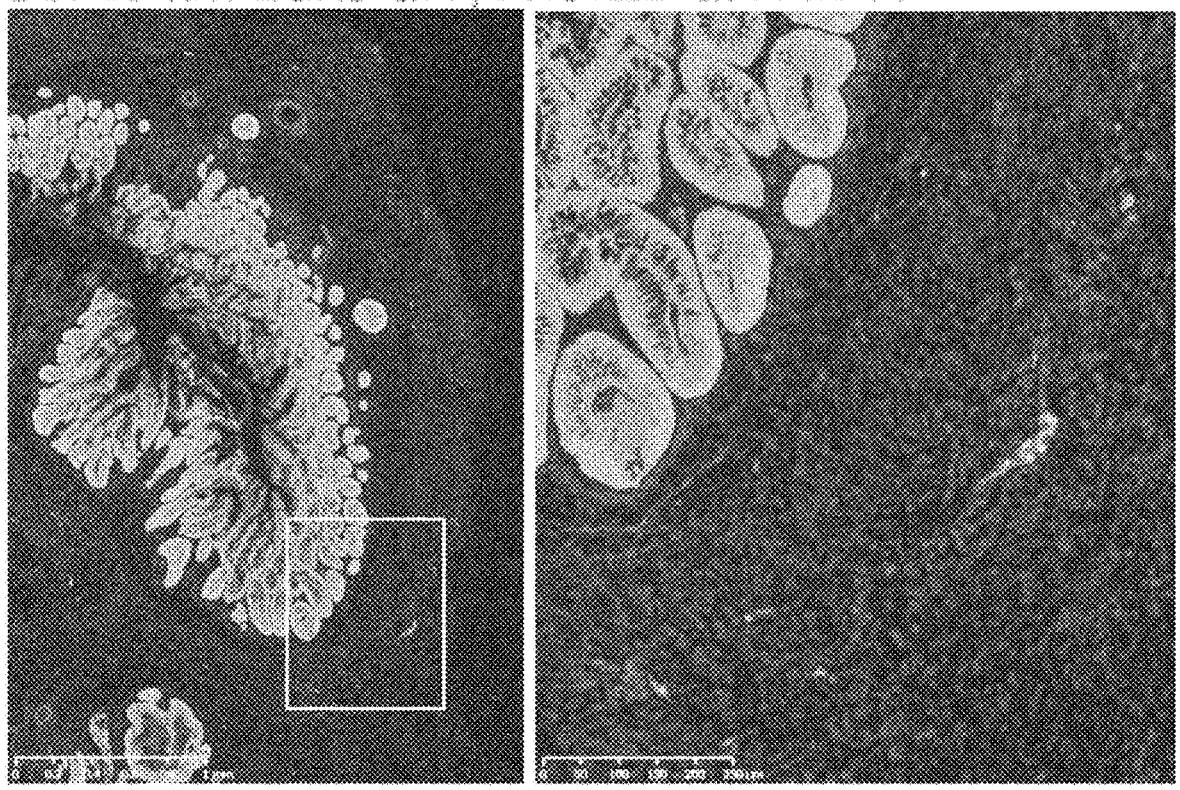
FIG. 8 shows fluorescent immunostaining images of an artificial intestinal tract formed from an intestinal organoid. PHOX2B-emGFP- and SOX10-tdTomato-positive cells derived from enteric neural precursors are shown. The upper right image is a partially enlarged view of the upper left image, and the lower right image is a partially enlarged view of the lower left image. In the fluorescent immunostaining images, the red color depicts the fluorescence of SOX10-tdTomato, the green color depicts the fluorescence of PHOX2B-emGFP, and the blue color depicts a nucleus.
Figure 8:
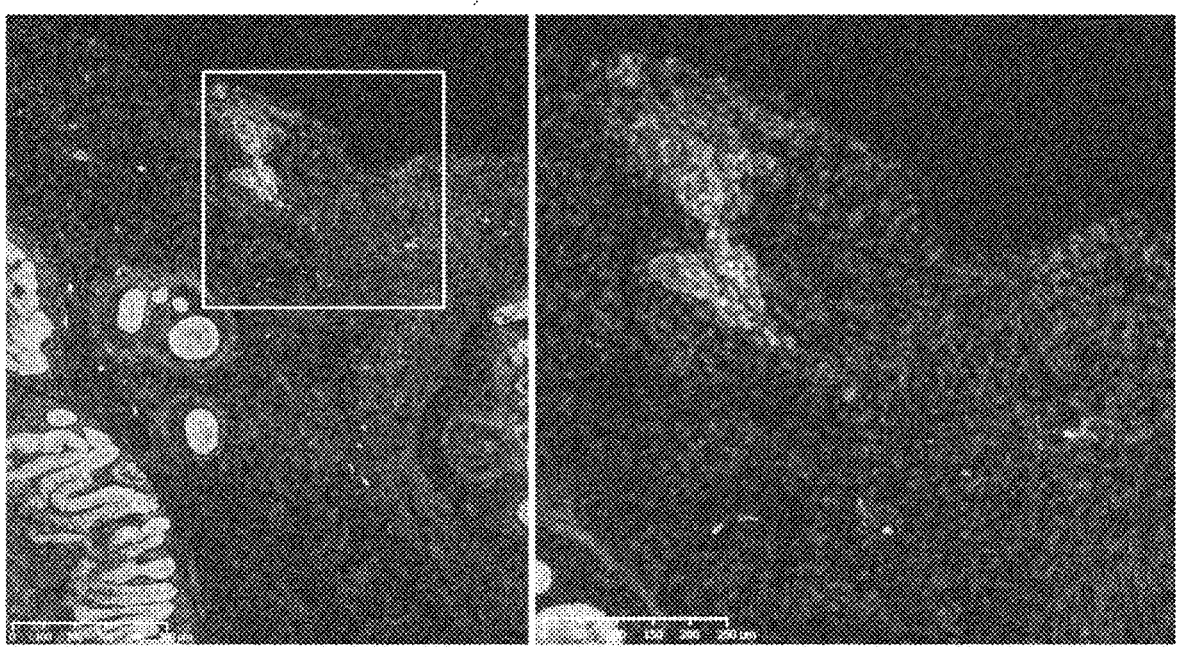
Figure 9:
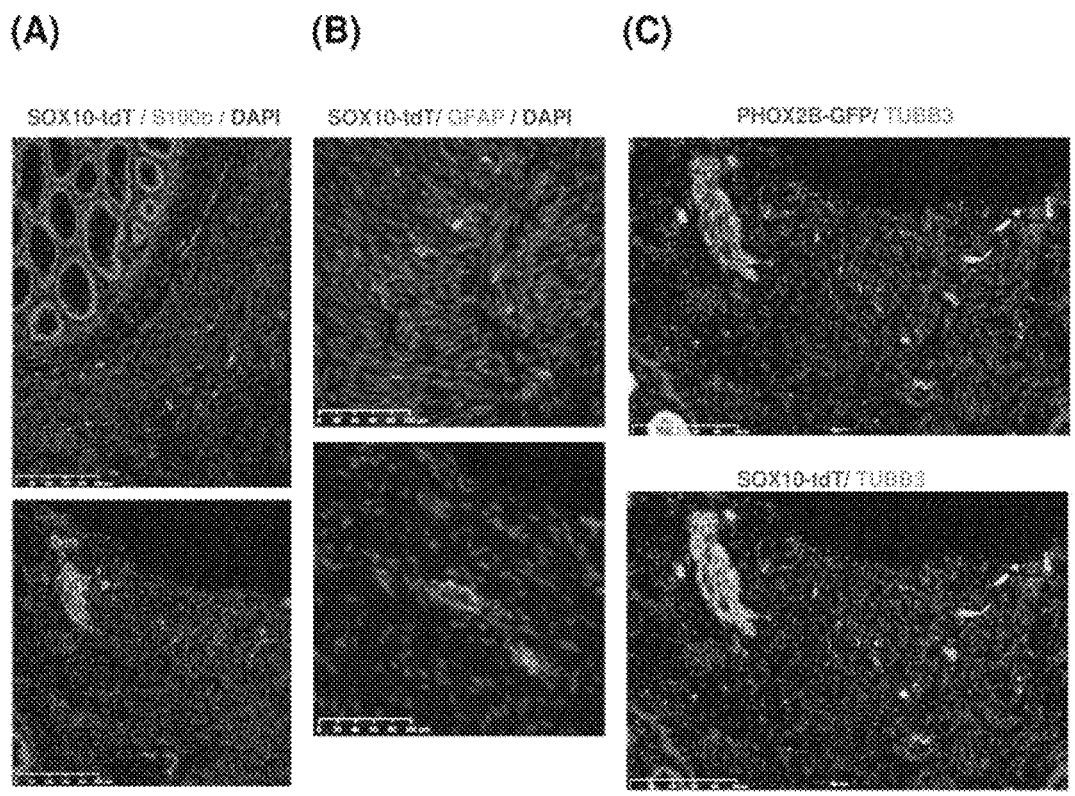
FIG. 9 shows fluorescent immunostaining images of an artificial intestinal tract formed from an intestinal organoid. S100β-positive (A), GFAP-positive (B) or TUBB3 (C)-positive nerve cells or glial cells derived from enteric neural precursors are shown. In the fluorescent immunostaining images, the red color depicts the fluorescence of SOX10-tdTomato, the green color depicts the fluorescence of PHOX2B-emGFP, the yellow color depicts the expression of S100β, GFAP or TUBB3, and the blue color depicts a nucleus.

The fluorescent immunostaining images are shown in FIGS. 8 and 9. As shown in FIG. 8, PHOX2B-emGFP- and SOX10-tdTomato-positive cells (nerve cells and glial cells) derived from enteric neural precursors were present. As shown in FIG. 9, a S100β (A)-, GFAP (B)- or TUBB3 (C)-positive image identical or similar to the PHOX2B-emGFP- or SOX10-tdTomato-positive image was observed, confirming that the cells derived from enteric neural precursors differentiated into nerve cells and glial cells. The enteric neural precursors obtained in Example 4 were shown to have the ability to differentiate into enteric nerve cells and constitute an artificial intestinal tract.

(4) Motor Function Analysis on Artificial Intestinal Tract

The collected artificial intestinal tract was cut into strip-like tissue sections. One end of the strip was hung in a chamber of an organ bath assay apparatus (Panlab, S.L.U.). The other end was connected to a pressure transducer (manufactured by Bio Research Center Co., Ltd.) so that the contractile and relaxant responses of the tissue section was quantitatively monitorable. The chamber was filled with a Krebs solution (NaCl: 120.7 mM, KCl: 5.9 mM, $NaHCO_3$: 15.5 mM, $NaH_2PO_4$: 1.2 mM, $MgCl_2$: 1.2 mM, $CaCl_2$: 2.5 mM, glucose: 11.5 mM), and 95% $O_2$ was exposed into the solution. The tissue section in the chamber was electrically stimulated, and its contractile and relaxant responses was measured.

Figure 10:
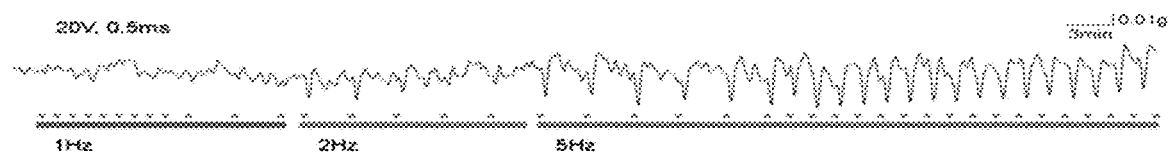
FIG. 10 is a graph showing results of measuring contractile and relaxant responses to electrical stimulation of an artificial intestinal tract formed from an intestinal organoid.
Figure 11:
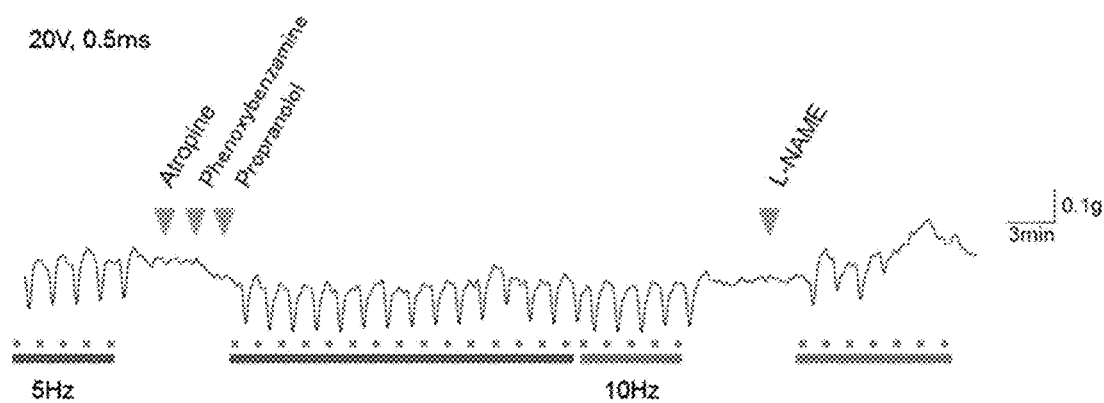
FIG. 11 is a graph showing results of measuring contractile and relaxant responses to electrical stimulation of an artificial intestinal tract formed from an intestinal organoid.
Figure 12:
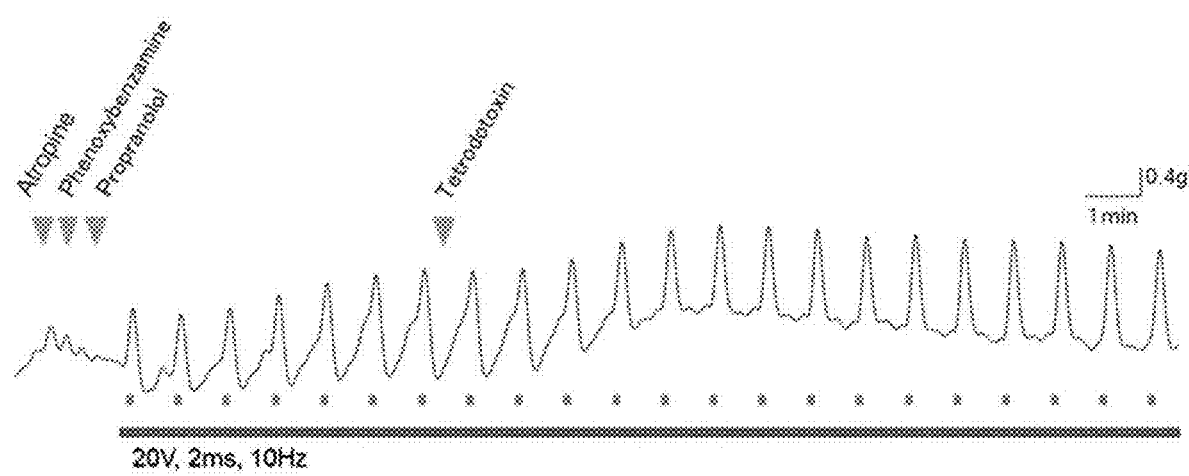
FIG. 12 is a graph showing results of measuring contractile and relaxant responses to electrical stimulation of an artificial intestinal tract formed from an intestinal organoid.

The results are shown in FIGS. 10 to 12. Contractile and relaxant responses to electrical stimulation were confirmed (see FIG. 10). The contractile response was partially canceled by the addition of 1 µM muscarinic acetylcholine receptor inhibitor atropine sulfate monohydrate (FUJIFILM Wako Pure Chemical Corp.), 10 µM a-adrenergic blocking drug phenoxybenzamine hydrochloride (Tokyo Chemical Industry Co., Ltd.), or 10 µM β-adrenergic blocking drug propranolol hydrochloride (FUJIFILM Wako Pure Chemical Corp.) (see FIG. 11). This suggested that the enteric neural precursors obtained in Example 4 formed nerve contracting muscle by producing acetylcholine and adrenaline in the artificial intestinal tract.

On the other hand, the relaxant response dependent on electrical stimulation remained. The relaxant response disappeared by the addition of a nitrogen monoxide synthase inhibitor NG-nitro-L-arginine methyl ester hydrochloride (see FIG. 11). This suggested that the enteric neural precursors obtained in Example 4 formed nerve relaxing muscle by producing nitrogen monoxide in the artificial intestinal tract.

The cancelation of the contractile response by the addition of 1 µM atropine sulfate monohydrate, 10 µM phenoxybenzamine hydrochloride or 10 µM propranolol hydrochloride disappeared by the addition of 3 µM tetrodotoxin (FUJIFILM Wako Pure Chemical Corp.). This also suggested that the nerve cells obtained by the differentiation of the enteric neural precursors have the function of relaxing muscle in response to electrical stimulation.

Test Example 13: Preparation of Frozen Stock of Expansion-Cultured Enteric Neural Precursors, and Characterization after Thawing of Frozen Stock A frozen stock was prepared using enteric neural precursors obtained in the same way as in Test Example 4. Also, the proliferative capacity and differentiation capacity of the enteric neural precursors were confirmed after thawing of the frozen stock.

A cell suspension of enteric neural precursors on 76 days of differentiation was centrifuged at 300×g for 3 minutes, followed by the removal of the supernatant. Then, the cells were suspended at a concentration of 200,000 cells/200 µL in STEM-CELLBANKER® GMP Grade (Nippon Zenyaku Kogyo Co., Ltd.) and cryopreserved at -80° C.

The frozen stock was thawed at 37° C. The cells were suspended in an enteric neural precursor medium and then centrifuged at 300×g for 3 minutes, followed by the removal of the supernatant. Then, the cells were resuspended in an enteric neural precursor medium. The cells were cultured by the method described in Test Example 4. Also, passages and flow cytometry analysis were carried out by the methods described in Test Examples 4 and 5. Further, differentiation capacity into enteric nerve cells and glial cells was confirmed according to the methods described in Test Examples 8 and 14.

Figure 13:
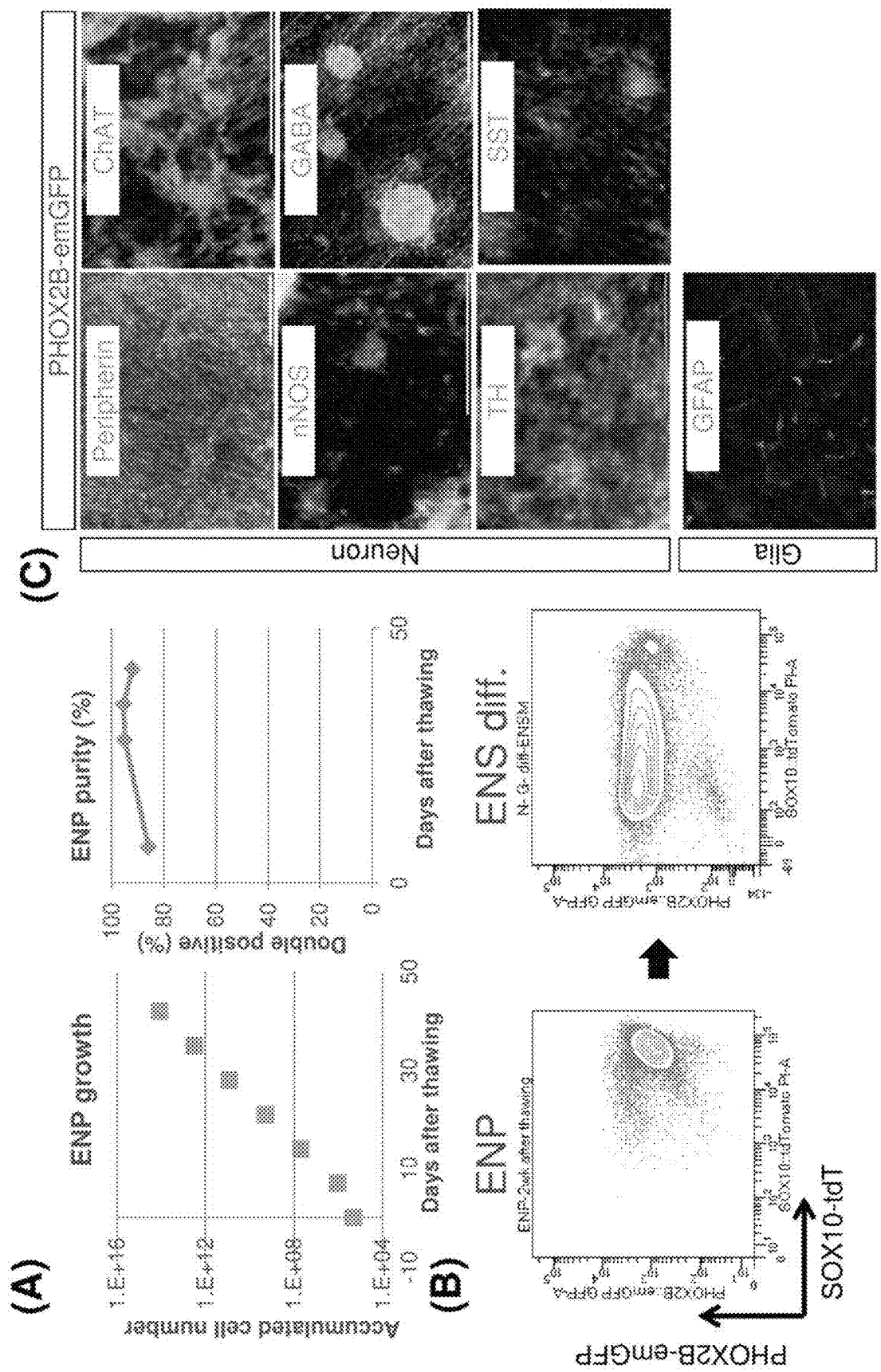
FIG. 13 shows results of evaluating the proliferative capacity and differentiation capacity of enteric neural precursors freeze-thawed after expansion culture.

The results are shown in FIG. 13. FIG. 13(A) shows time-dependent change in cell number during expansion culture, and time-dependent change in the ratio of enteric neural precursors to all cells during expansion culture. FIG. 13(B) shows results of analyzing the expression of PHOX2B and SOX10 by flow cytometry in enteric neural precursors (ENP) and enteric nerve cells (ENS) obtained by the differentiation thereof. FIG. 13(C) shows fluorescent immunostaining images of enteric nerve cells and glial cells obtained by the differentiation of enteric neural precursors. The enteric neural precursors thus freeze-thawed were confirmed to maintain excellent proliferative capacity. Also, the enteric neural precursors freeze-thawed were confirmed to retain differentiation capacity into enteric nerve cells (PHOX2B- and peripherin-positive and SOX10-negative) and glial cells (GFAP-positive). The enteric nerve cells included various subtypes expressing nNOS (neuronal nitric oxide synthase), TH (tyrosine hydroxylase), ChAT (choline acetyltransferase), GABA (gamma amino butyric acid) or SST (somatostatin).

Test Example 14: Differentiation of Enteric Neural Precursors into Glial Cells

Differentiation into glial cells was performed using enteric neural precursors obtained in the same way as in Test Example 4.

The medium for differentiation into glial cells used was Astrocyte maturation kit (STEMCELL Technologies Inc.) supplemented with Penicillin-Streptomycin (Life Technologies Corp.).

Cells on 46 days of culture were fixed in paraformaldehyde/phosphate-buffered saline and subjected to fluorescent immunostaining. The cells were sequentially reacted with an anti-GFAP antibody (CST #3670, Cell Signaling Technology, Inc.) as a primary antibody and further with a fluorescently labeled secondary antibody appropriate for an immunized animal of the primary antibody as a secondary antibody, and then observed under a fluorescence microscope.

Figure 14:
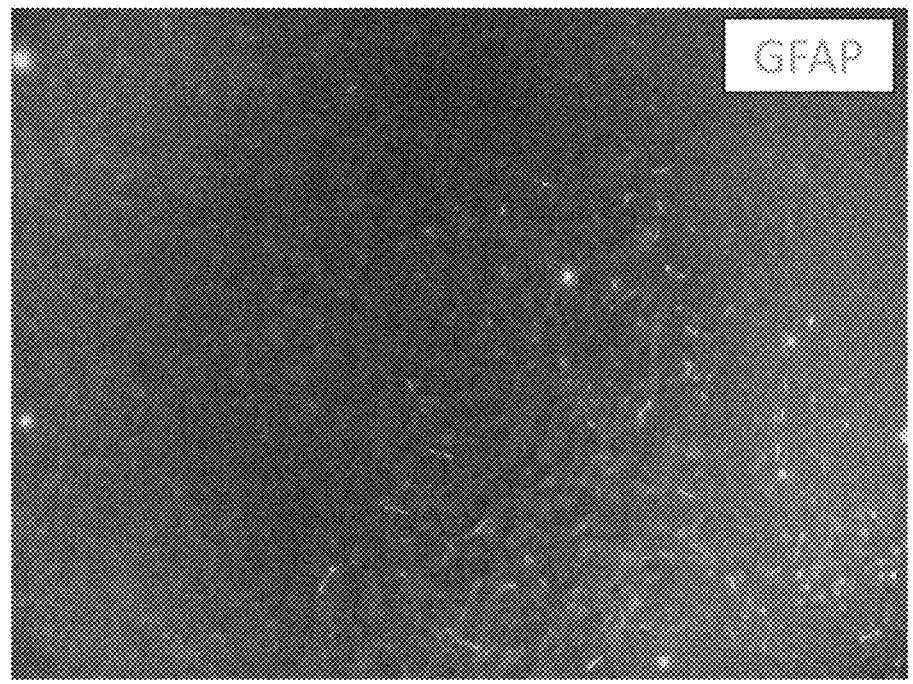
FIG. 14 shows a fluorescent immunostaining image of glial cells obtained by the differentiation of enteric neural precursors after expansion culture.

The fluorescent immunostaining image is shown in FIG. 14. GFAP-positive glial cells were confirmed. Thus, the enteric neural precursors obtained by this culture method were shown to retain differentiation capacity into glial cells.

Test Example 15: Confirmation of Graft Survival of Enteric Neural Precursors in Immunodeficient Mouse Intestinal Tract Graft survival in immunodeficient mouse intestinal tract was confirmed using enteric neural precursors obtained in the same way as in Test Example 4.

(1) Preparation of Cell Mass of Enteric Neural Precursors for Transplantation

The enteric neural precursors were suspended in an enteric neural precursor medium, seeded at 320,000 cells/well to a sphere culture plate (RB500 400 NA 24, Kuraray Co., Ltd.), and cultured for 3 days to construct a cell mass (sphere).

(2) Transplantation of Enteric Neural Precursors to Mouse

The obtained cell mass (sphere) was recovered and transplanted at 580 spheres/site/mouse to the cecal walls of immunodeficient mice (NOD. CB17-Prkdc<scid>/J, male, 6 weeks old, Charles River Laboratories Japan, Inc.) whose abdomen was opened under anesthesia, using a syringe needle (30 gauge). The medium used for transplantation was a mixture of Matrigel® and an enteric neural precursor medium at a ratio of 1:1 (v/v). One week later, the animals were euthanized, and tissues around the transplant sites were collected and fixed in 4% paraformaldehyde/phosphate-buffered saline.

(3) Histological Analysis on Sample after Transplantation

The fixed samples were subjected to fluorescent immunostaining. The samples were sequentially reacted with an anti-TUBB3 antibody (Abcam plc) as a primary antibody and further with a fluorescently labeled secondary antibody appropriate for an immunized animal of the primary antibody as a secondary antibody, and then observed under a fluorescence microscope.

Figure 15:
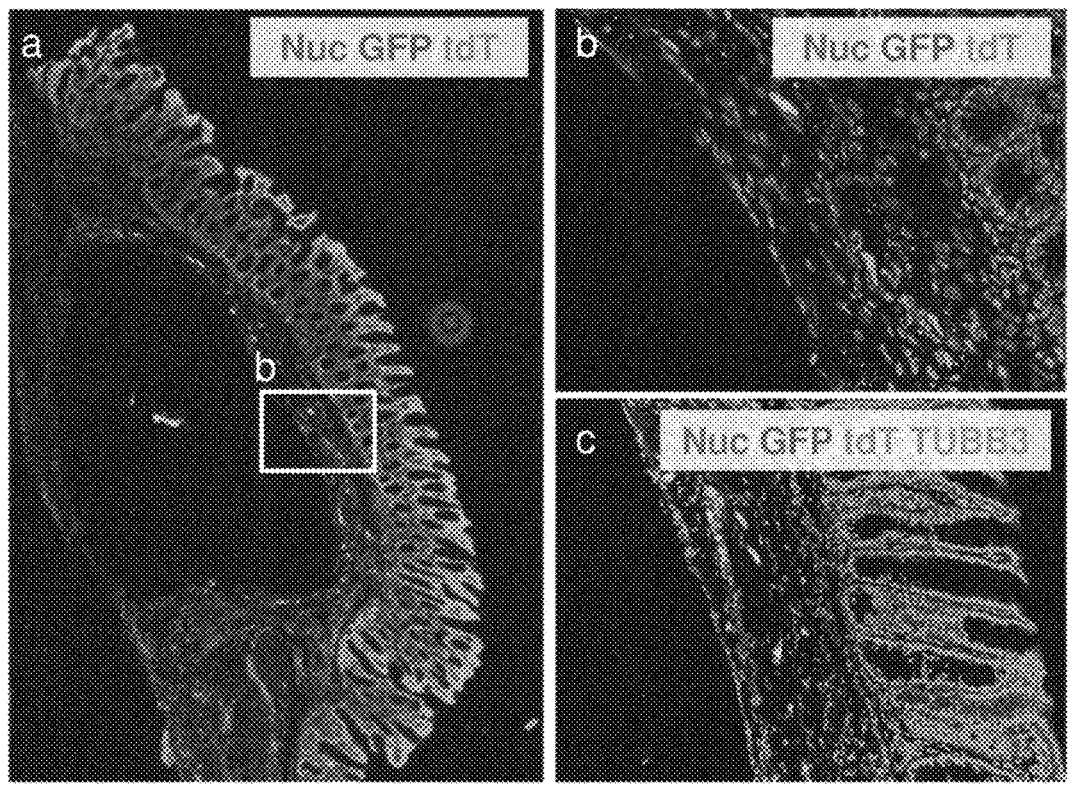
FIG. 15 shows fluorescent immunostaining images of a transplant site after a lapse of 1 week from the transplantation of enteric neural precursors after expansion culture to mouse cecal wall. In the fluorescent immunostaining images, the blue color depicts a nucleus, the green color depicts the fluorescence of PHOX2B-emGFP, the red color depicts the fluorescence of SOX10-tdTomato, and the purple color depicts the expression of TUBB3.

The fluorescent immunostaining images are shown in FIG. 15. PHOX2B-emGFP- and SOX10-tdTomato-positive cells (cells considered to be in the process of differentiation into nerve cells and glial cells) derived from enteric neural precursors were present at a site corresponding to the submucosal layer to the muscular layer of the mouse intestinal tract (a and b). The enteric neural precursors were confirmed to be engrafted in the mouse intestinal tract. A TUBB3-positive image (c) identical or similar to the PHOX2B-emGFP- or SOX10-tdTomato-positive image was observed, confirming that the cells derived from enteric neural precursors were in the process of differentiation into nerve cells.

[Free Text of Sequence Listing]

SEQ ID NO: 1: Full-length amino acid sequence of human NRG1

SEQUENCE LISTING

The invention claimed is:

1. A method for producing enteric neural precursor cells, comprising the steps of:
   (1) providing SOX10-positive and PHOX2B-negative neural crest cells;
   (2) culturing the neural crest cells for differentiation in a medium comprising NRG1 and retinoic acid and/or a derivative thereof, thereby producing enteric neural precursor cells,
   wherein the derivative of retinoic acid is one or more selected form the group consisting of retinol, retinal, retinoin, isoretinoin, alitretinoin, etretinate, acitretin, tazarotene, bexarotene, and adapalene,
   wherein the medium comprises a TGFβ inhibitor and GSK3β inhibitor,
   wherein the enteric neural precursor cells are SOX10-positive and PHOX2B-positive; and
   (3) culturing the enteric neural precursor cells for proliferation, for a period of at least 40 days, in a medium comprising NRG1 and retinoic acid and/or derivative thereof, wherein the expanded enteric neural precursor cells are SOX10-positive and PHOX2B-positive.

2. The production method according to claim 1, wherein the neural crest cells of step 1 are vagal neural crest cells.

3. The production method according to claim 1, wherein the neural crest cells of step 1 are HOXB5-positive and HOXB9-negative.

4. An expansion culture method for enteric neural precursor cells, comprising the steps of:
   (1) providing SOX10-positive and PHOX2B-positive enteric neural precursor cells; and
   (2) culturing the enteric neural precursor cells for proliferation, for a period of at least 40 days, in a medium comprising NRG1 and retinoic acid and/or derivative thereof, thereby expanding enteric neural precursor cells,
   wherein the derivative of retinoic acid is one or more selected form the group consisting of retinol, retinal, retinoin, isoretinoin, alitretinoin, etretinate, acitretin, tazarotene, bexarotene, and adapalene,
   wherein the medium comprises a TGFβ inhibitor and GSK3β inhibitor,
   wherein the expanded enteric neural precursor cells are SOX10-positive and PHOX2B-positive.

5. The production method according to claim 1, wherein the medium of step (2) or (3) further comprises a glial cell-derived neurotrophic factor (GDNF).

6. The production method according to claim 1, wherein the medium of step (2) or (3) further comprises a soluble basement membrane preparation extracted from Engelbreth-Holm-Swarm (EHS) mouse sarcoma.

7. The production method according to claim 1, wherein the medium of step (2) or (3) comprises NRG1 at a concentration of 50 to 200 ng/ml.

8. The method according to claim 4, wherein the medium further comprises a glial cell-derived neurotrophic factor (GDNF).

9. The method according to claim 4, wherein the medium further comprises a soluble basement membrane preparation extracted from Engelbreth-Holm-Swarm (EHS) mouse sarcoma.

10. The method according to claim 4, wherein the medium comprises NRG1 at a concentration of 50 to 200 ng/ml.

* * * * *

SEQUENCE LISTING

```
<160> NUMBER OF SEQ ID NOS: 1

<210> SEQ ID NO 1
<211> LENGTH: 645
<212> TYPE: PRT
<213> ORGANISM: Homo sapiens

<400> SEQUENCE: 1

Met Ser Glu Arg Lys Glu Gly Arg Gly Lys Gly Lys Gly Lys Lys Lys
1               5                   10                  15

Glu Arg Gly Ser Gly Lys Lys Pro Glu Ser Ala Ala Gly Ser Gln Ser
            20                  25                  30

Pro Ala Leu Pro Pro Arg Leu Lys Glu Met Lys Ser Gln Glu Ser Ala
        35                  40                  45

Ala Gly Ser Lys Leu Val Leu Arg Cys Glu Thr Ser Ser Glu Tyr Ser
    50                  55                  60
```

```
Ser Leu Arg Phe Lys Trp Phe Lys Asn Gly Asn Glu Leu Asn Arg Lys
 65                  70                  75                  80

Asn Lys Pro Gln Asn Ile Lys Ile Gln Lys Pro Gly Lys Ser Glu
             85                  90                  95

Leu Arg Ile Asn Lys Ala Ser Leu Ala Asp Ser Gly Glu Tyr Met Cys
            100                 105                 110

Lys Val Ile Ser Lys Leu Gly Asn Asp Ser Ala Ser Ala Asn Ile Thr
            115                 120                 125

Ile Val Glu Ser Asn Glu Ile Ile Thr Gly Met Pro Ala Ser Thr Glu
130                 135                 140

Gly Ala Tyr Val Ser Ser Glu Ser Pro Ile Arg Ile Ser Val Ser Thr
145                 150                 155                 160

Glu Gly Ala Asn Thr Ser Ser Ser Thr Ser Thr Ser Thr Thr Gly Thr
                165                 170                 175

Ser His Leu Val Lys Cys Ala Glu Lys Glu Lys Thr Phe Cys Val Asn
            180                 185                 190

Gly Gly Glu Cys Phe Met Val Lys Asp Leu Ser Asn Pro Ser Arg Tyr
            195                 200                 205

Leu Cys Lys Cys Pro Asn Glu Phe Thr Gly Asp Arg Cys Gln Asn Tyr
            210                 215                 220

Val Met Ala Ser Phe Tyr Lys His Leu Gly Ile Glu Phe Met Glu Ala
225                 230                 235                 240

Glu Glu Leu Tyr Gln Lys Arg Val Leu Thr Ile Thr Gly Ile Cys Ile
                245                 250                 255

Ala Leu Leu Val Val Gly Ile Met Cys Val Val Ala Tyr Cys Lys Thr
            260                 265                 270

Lys Lys Gln Arg Lys Lys Leu His Asp Arg Leu Arg Gln Ser Leu Arg
            275                 280                 285

Ser Glu Arg Asn Asn Met Met Asn Ile Ala Asn Gly Pro His His Pro
290                 295                 300

Asn Pro Pro Pro Glu Asn Val Gln Leu Val Asn Gln Tyr Val Ser Lys
305                 310                 315                 320

Asn Val Ile Ser Ser Glu His Ile Val Glu Arg Glu Ala Glu Thr Ser
                325                 330                 335

Phe Ser Thr Ser His Tyr Thr Ser Thr Ala His His Ser Thr Thr Val
            340                 345                 350

Thr Gln Thr Pro Ser His Ser Trp Ser Asn Gly His Thr Glu Ser Ile
            355                 360                 365

Leu Ser Glu Ser His Ser Val Ile Val Met Ser Ser Val Glu Asn Ser
370                 375                 380

Arg His Ser Ser Pro Thr Gly Gly Pro Arg Gly Arg Leu Asn Gly Thr
385                 390                 395                 400

Gly Gly Pro Arg Glu Cys Asn Ser Phe Leu Arg His Ala Arg Glu Thr
                405                 410                 415

Pro Asp Ser Tyr Arg Asp Ser Pro His Ser Glu Arg Tyr Val Ser Ala
            420                 425                 430

Met Thr Thr Pro Ala Arg Met Ser Pro Val Asp Phe His Thr Pro Ser
            435                 440                 445

Ser Pro Lys Ser Pro Pro Ser Glu Met Ser Pro Pro Val Ser Ser Met
            450                 455                 460

Thr Val Ser Met Pro Ser Met Ala Val Ser Pro Phe Met Glu Glu Glu
465                 470                 475                 480
```

```
Arg Pro Leu Leu Leu Val Thr Pro Pro Arg Leu Arg Glu Lys Lys Phe
            485                 490                 495

Asp His His Pro Gln Gln Phe Ser Ser Phe His His Asn Pro Ala His
            500             505                 510

Asp Ser Asn Ser Leu Pro Ala Ser Pro Leu Arg Ile Val Glu Asp Glu
        515                 520                 525

Glu Tyr Glu Thr Thr Gln Glu Tyr Glu Pro Ala Gln Glu Pro Val Lys
    530                 535                 540

Lys Leu Ala Asn Ser Arg Arg Ala Lys Arg Thr Lys Pro Asn Gly His
545                 550                 555                 560

Ile Ala Asn Arg Leu Glu Val Asp Ser Asn Thr Ser Ser Gln Ser Ser
            565                 570                 575

Asn Ser Glu Ser Glu Thr Glu Asp Glu Arg Val Gly Glu Asp Thr Pro
            580                 585                 590

Phe Leu Gly Ile Gln Asn Pro Leu Ala Ala Ser Leu Glu Ala Thr Pro
        595                 600                 605

Ala Phe Arg Leu Ala Asp Ser Arg Thr Asn Pro Ala Gly Arg Phe Ser
        610                 615                 620

Thr Gln Glu Glu Ile Gln Ala Arg Leu Ser Ser Val Ile Ala Asn Gln
625                 630                 635                 640

Asp Pro Ile Ala Val
                645
```